(12) United States Patent
Bulut et al.

(10) Patent No.: US 11,537,602 B2
(45) Date of Patent: Dec. 27, 2022

(54) COMPUTER IMPLEMENTED LIVE CROSS WALKS IN COMPLIANCE MAPPINGS IN RESPONSE TO REGULATORY CHANGES AND ASSESSING RISKS OF CHANGES

(71) Applicant: INTERNATIONAL BUSINESS MACHINES CORPORATION, Armonk, NY (US)

(72) Inventors: Muhammed Fatih Bulut, Ossining, NY (US); Arun Kumar, Noida (IN); Kuntal Dey, New Delhi (IN); Constantin Mircea Adam, Fairfield, CT (US); Milton H. Hernandez, Tenafly, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 267 days.

(21) Appl. No.: 15/930,273

(22) Filed: May 12, 2020

(65) Prior Publication Data
US 2021/0357392 A1 Nov. 18, 2021

(51) Int. Cl.
*G06F 16/242* (2019.01)
*G06F 40/30* (2020.01)
(Continued)

(52) U.S. Cl.
CPC ............ *G06F 16/243* (2019.01); *G06F 16/23* (2019.01); *G06F 16/285* (2019.01);
(Continued)

(58) Field of Classification Search
CPC ...... G06F 16/243; G06F 16/285; G06F 16/23; G06F 40/284; G06F 40/30;
(Continued)

(56) References Cited

U.S. PATENT DOCUMENTS

| | | | |
|---|---|---|---|
| 6,064,968 | A | 5/2000 | Schanz |
| 6,067,549 | A | 5/2000 | Smalley et al. |
| 6,192,360 | B1 | 2/2001 | Dumais et al. |
| 8,028,269 | B2 | 9/2011 | Bhatia et al. |

(Continued)

OTHER PUBLICATIONS

Li, W. et al., "G-Finder: Routing Programming Questions Closer to the Experts"; OOPSLA/SPLASH (2010); 12 pgs.
Mell, P. et al., "Recommendations of the National Institute of Standards and Technology"; NIST Special Publication 800-145 (2011); 7 pgs.

*Primary Examiner* — Evan Aspinwall
(74) *Attorney, Agent, or Firm* — Intelletek Law Group, PLLC; Gabriel Daniel, Esq.

(57) ABSTRACT

Computer implemented reconstruction of compliance mapping due to an update in a regulation in the compliance mapping by a computing device includes comparing a first version of a regulation in the compliance mapping to a second, updated version of the first regulation. A change in the second version with respect to the first version is identified. The change may be an added control description, a deleted control description, or an updated control description. Upon determining that the change is an updated control description, the updated control description is analyzed to determine a type of update. The mapping of the regulation is reconstructed based on the change and, if the change is an updated control description, the type of update, using at least one of natural language processing and/or machine learning. The risk of the reconstructed mapping is assessed, and a service owner is notified about the risk of the changes.

20 Claims, 21 Drawing Sheets

(51) Int. Cl.
*G06N 20/00* (2019.01)
*G06F 16/28* (2019.01)
*G06F 16/23* (2019.01)
*G06F 40/284* (2020.01)

(52) U.S. Cl.
CPC ............ *G06F 40/284* (2020.01); *G06F 40/30* (2020.01); *G06N 20/00* (2019.01)

(58) Field of Classification Search
CPC ............. G06F 16/2358; G06F 16/9024; G06F 16/24578; G06F 16/35; G06F 16/287; G06N 20/00; H04L 41/0893; H04L 41/12; H04L 41/14; H04L 43/065; H04L 67/125
USPC .................................................. 707/722, 737
See application file for complete search history.

(56) References Cited

U.S. PATENT DOCUMENTS

| | | |
|---|---|---|
| 9,003,537 B2 | 4/2015 | Raz |
| 9,009,197 B2 | 4/2015 | Cougias |
| 9,053,441 B2 | 6/2015 | Sebald |
| 2003/0069894 A1 | 4/2003 | Cotter et al. |
| 2008/0082377 A1 | 4/2008 | Kennis et al. |
| 2008/0222631 A1* | 9/2008 | Bhatia ................. G06F 11/3604 717/178 |
| 2010/0114628 A1 | 5/2010 | Adler |
| 2011/0208662 A1* | 8/2011 | Haunschild .......... G06Q 30/018 705/317 |
| 2019/0026474 A1* | 1/2019 | Adam ................... G06F 21/564 |
| 2020/0021620 A1* | 1/2020 | Purathepparambil ........................ H04L 63/102 |
| 2021/0125089 A1* | 4/2021 | Nickl ..................... H04L 63/14 |

* cited by examiner

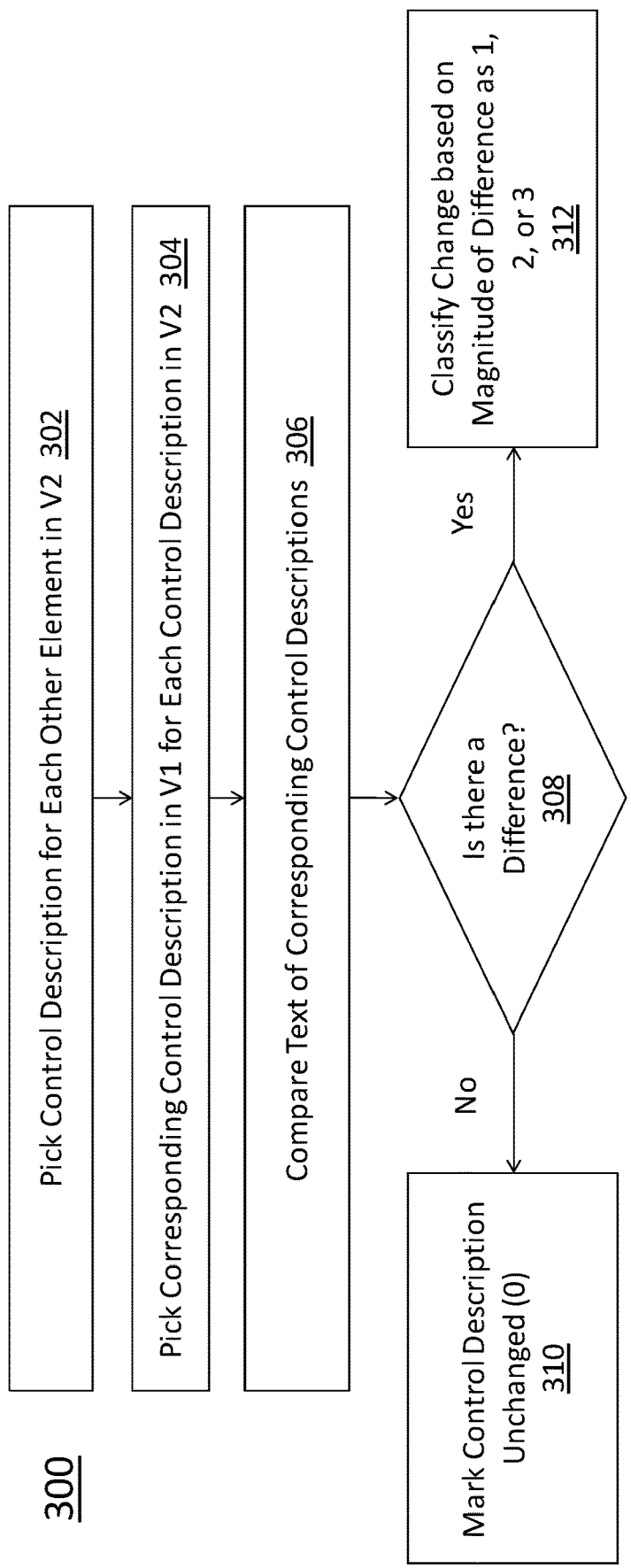

326

- Given Two Versions of Corresponding Control Description Texts t1, t2  328
- Convert $t_1$ and $t_2$ to Vectors $v_1$ and $v_2$  330
- Classify Semantic Change from $v_1$ to $v_2$ as 0, 1, 2, 3 with Machine Learning  332
- Store Classification and Associated Control Descriptions  334

Fig. 9

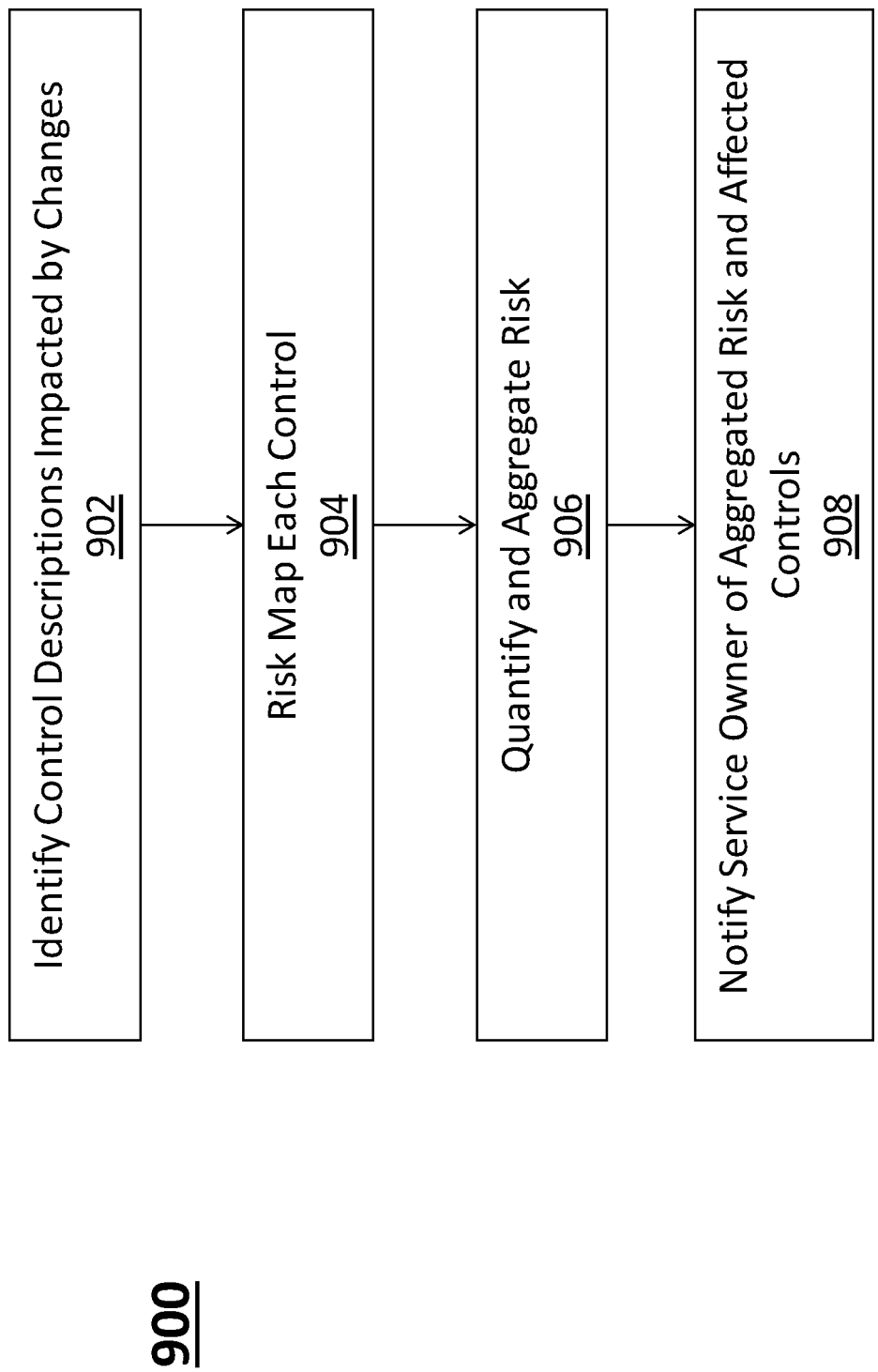

COMPUTER IMPLEMENTED LIVE CROSS WALKS IN COMPLIANCE MAPPINGS IN RESPONSE TO REGULATORY CHANGES AND ASSESSING RISKS OF CHANGES

BACKGROUND

Technical Field

The present disclosure generally relates to compliance, and more particularly, to systems and methods of handling updates to regulatory mappings due to updates in the regulations.

Description of the Related Art

Compliance is a complex process that includes many regulations. The activities of many entities are subject to multiple regulations and multiple standards that implement or meet regulations. For example, entities may be subject to the National Institute of Standards and Technology ("NIST"), Federal Information Security Management Act ("FISMA"), Payment Card Industry Data Security Standard ("PCI-DSS"), General Data Privacy Regulations ("GDPR"), Health Insurance Portability and Accountability Act ("HIPAA"), and Family Educational Rights and Privacy Act ("FERPA") regulations. The entities may also be subject to the Center for Internet Security ("CIS"), the Information Security Management Systems ("ISO27000"), Security and Technical Implementation Guides (STIGs) standards.

Several organizations use a baseline, such as NIST 800-53 rev4, for example, and map other regulations to the baseline to reduce the complexity. When a new regulation is released, any change in any regulation are analyzed and changes reflected in the mappings. Services that use the mapping are notified so that the compliance posture is available to the service owners. Hundreds of services could require revalidation and compliance certification due to a respective change.

SUMMARY

A computer implemented method for reconstructing a compliance mapping due to an update in a regulation in the compliance mapping by a computing device is disclosed. A first version of a regulation in the compliance mapping is compared to a second version of the regulation, which is typically an updated version of the first version. A change in the second version with respect to the first version is identified. The change may be an added control description, a deleted control description, or an updated control description. Upon determining that the change is an updated control description, the updated control description is analyzed to determine a type of update. The mapping of the regulation is reconstructed based on the change and, if the change is an updated control description, the type of update, using at least one of natural language processing and/or machine learning. The risk of the reconstructed mapping is assessed and a service owner is notified about the risk of the identified changes. A computing device and a non-transitory storage medium are also enclosed in accordance with embodiments of the disclosure.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or blocks and/or without all of the components or blocks that are illustrated. When the same numeral appears in different drawings, it refers to the same or like components or blocks.

FIG. 8 is a flowchart of an example of the use of lexical analysis to identify and classify changes in different versions of a regulation.

FIG. 9 is a flowchart of an example of a semantic technique to classify changes in control descriptions semantically using the machine learning model.

FIG. 14 is a flowchart of an example of risk analysis in accordance with an embodiment of the disclosure.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Navigating the regulatory complexity is difficult due to the large number of regulations with related provisions. The present disclosure generally relates to methods and systems for automatically updating live crosswalks, or links between a baseline regulation and regulations mapped to the baseline in a compliance mapping to reflect regulatory changes. In accordance with certain embodiments of the disclosure, the risk of such updates is also assessed and provided to a service owner. For example, the risk to an entity of a change in a regulatory node in the crosswalk may be interpreted with respect to the compliance posture of cloud services. Natural language processing ("NLP") and/or machine learning are used to identify the changes to the mapping or links between the control descriptions of the baseline and mapped regulations due to updates in the control descriptions of the regulations, enabling more rapid and accurate incorporation of updates to regulations in compliance mappings, with decreased or no human interventions. Providing feedback from the human intervention improves machine learning models to further decrease human intervention over time and increase the speed of updating of the compliance mapping. The more rapid incorporation of updates in compliance mapping due to the use of NLP and machine learning, in accordance with embodiments of the disclosure, results in more rapid and accurate identification of the changes. This can result in improved compliance by service owners, and thereby lower cost of audit penalties and exploitation of vulnerabilities by assisting service owners in being compliant. In one example, not being compliant with security regulations could render a party or its products susceptible to hacking, for example. In one example, the ability of cloud services to provide compliant, secure virtual machines and containers, for example, is improved.

Figure 1:
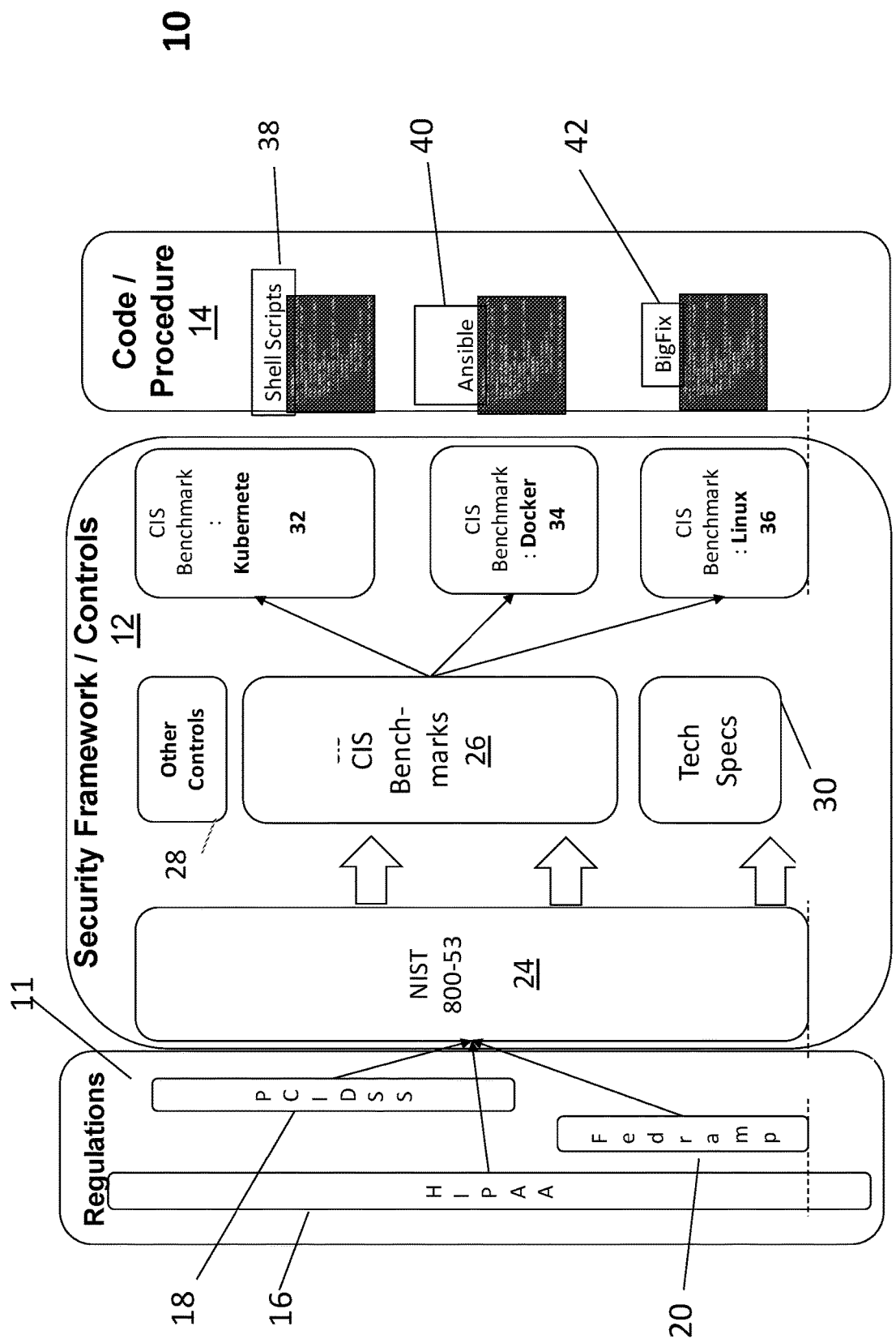
FIG. 1 is a schematic representation of an example of the relation between regulations, a security framework and controls, and codes and procedures of implementations in accordance with the security framework and controls.

FIG. 1 is a schematic representation 10 of an example of the relation between regulations 11, a security framework and controls 12, and codes and procedures 14 of implementations in accordance with the security framework and controls. In this example, the regulations are mapped to the security framework, which is mapped to the control set. The control set is mapped to the implementations. The regulations 11 in this example are HIPAA 16, PCI-DSS 18, and Federal Risk and Authorization Management Program ("FedRAMP") 20. The security framework/controls 12 include in this example National Institute of Standards and Technology Special Publication ("NIST SP") 800-53 24, which is a catalog of security and privacy controls and Center for Internet Security ("CIS") Benchmarks 26, which specify the controls needed to implement specific systems, such as the CIS Benchmarks discussed below. NIST 800-53 24 and CIS 26 form the basis for secure, consistent communications between parties. Other organizations have their own control definitions, indicated as Other Controls 28. An organization may have their own control definitions, for example, indicated by Technical Specifications 30. Implementations of these controls are available in different deployment models, such as CIS Benchmark: Kubernetes 32, CIS Benchmark: Docker 34, and CIS Benchmark: Linux 36. Shell Scripts 38, Ansible 40, and BigFix 42 are examples of methods of implementing the CIS Benchmarks. A change in a regulation or security framework or control may require revalidation and compliance certification for hundreds of services.

Figure 2:
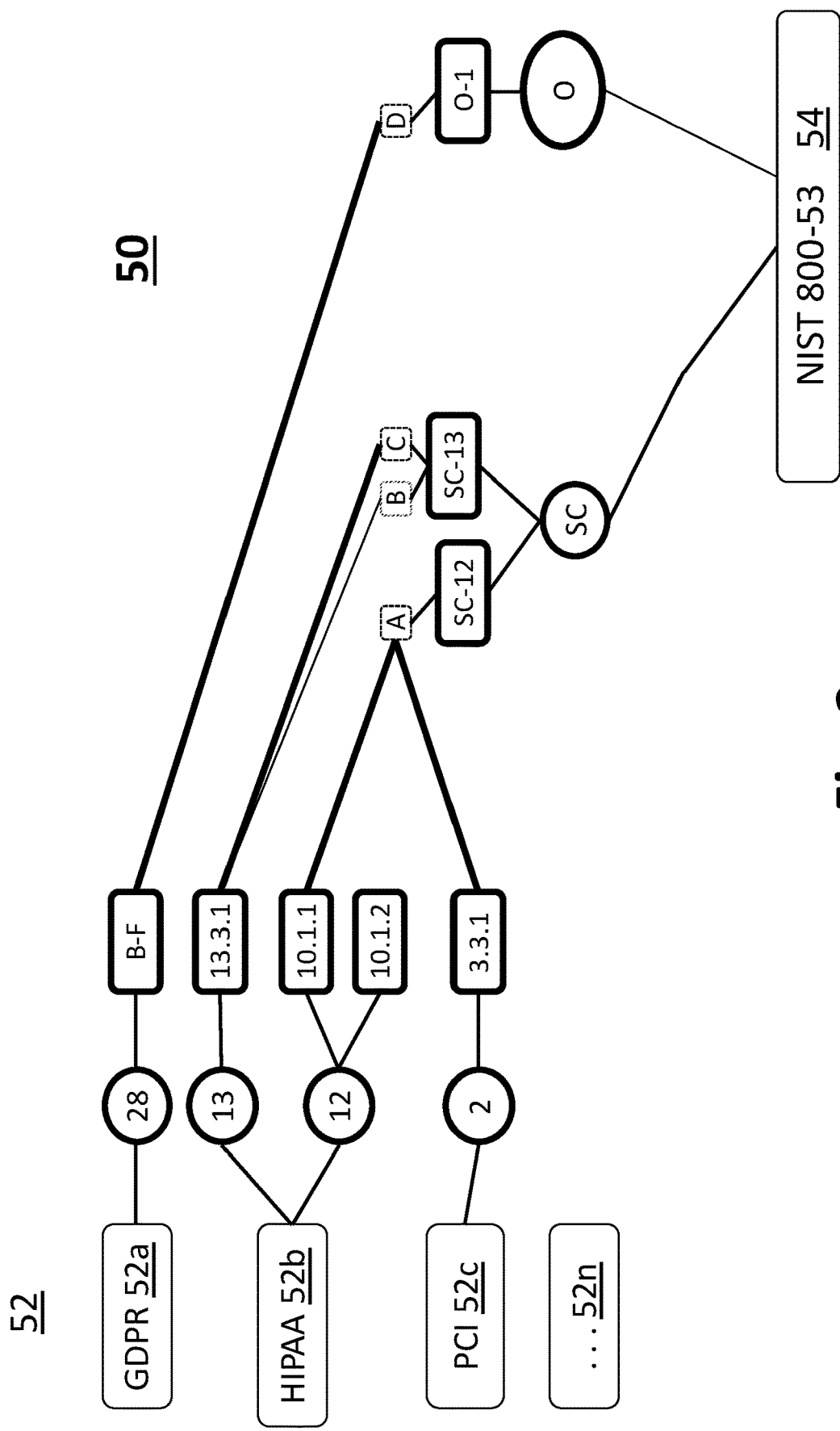
FIG. 2 is an example of a mapping of regulations to a baseline regulation.

FIG. 2 is an example of a compliance mapping 50 showing the relation between provisions of mapped regulations 52 and a baseline regulation(s) 54, to facilitate understanding of the regulatory landscape. In the example of FIG. 2, the compliance mapping 50 displays the relationship between a security framework of multiple regulations. In other examples, other types of regulatory provisions may be mapped. The mapped regulations 52 in this example are GDPR 52a, HIPAA 52b, PCI-DSS 52c. Other regulations may also be included, as indicated by 52n. The baseline regulation 54 in this example are NIST 800-53.

The mapping 50 shows that Paragraph SC of the NIST 800-53 baseline regulation 54 has a Paragraph SC-12 that corresponds to HIPAA Par. 12.10.1.1 and PCI-DSS Par. 2.3.3.1. Since these respective regulations both correspond to a NIST 800-53 baseline control, they are mapped to the same node A of the compliance mapping 50. Paragraph SC-13 of NIST 800-52 corresponds to HIPAA 13.3.1. Paragraph SC-13 also corresponds to a second portion of HIPAA 13.3.1, identified as node C. GDPR 52a Paragraph 28 (B)-(F) correspond to Paragraph 0-1 of NIST 800-53 at node D. The baseline 54 may be another security regulation, similar to NIST 800-53 or proprietary regulations, for example. Compliance mappings may be provided for other baseline regulations 54 and other mapped regulations 52, including non-security regulations. The mappings in FIG. 2 are merely illustrative and do not represent actual mappings.

Figure 3B:
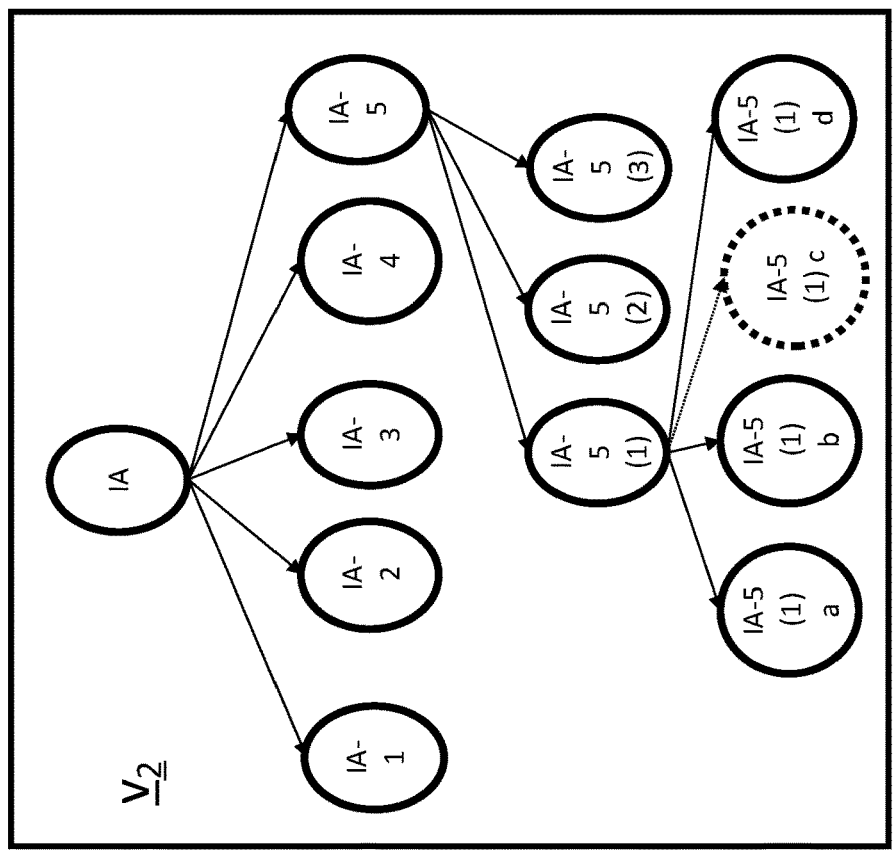
FIG. 3B is a schematic representation of an example of an updated version 2 or V2 of the same portion of the regulation of FIG. 3A.
Figure 3A:
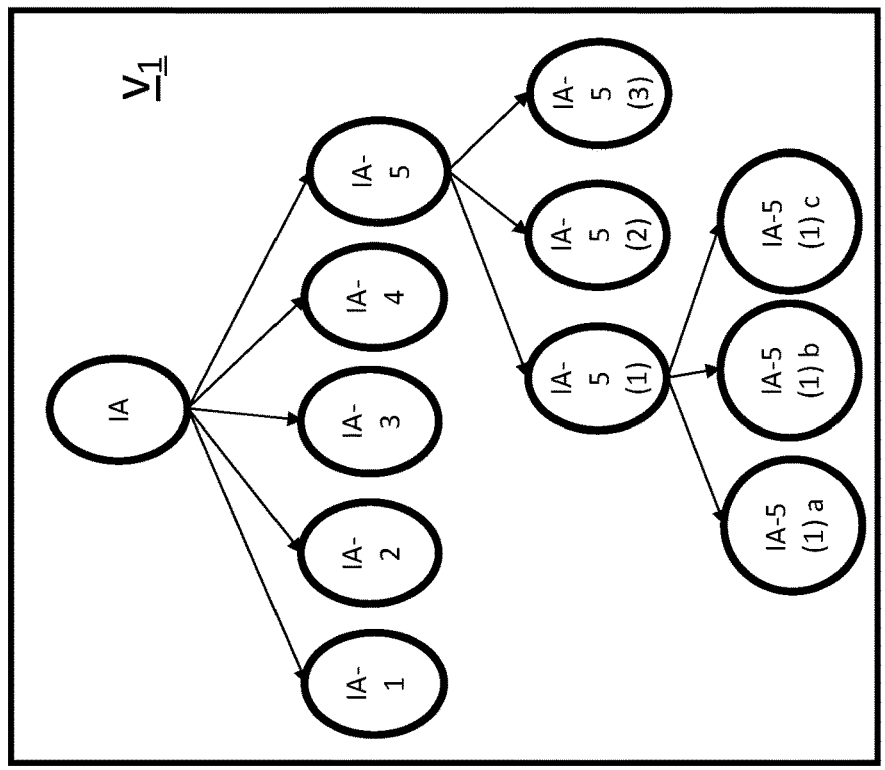
FIG. 3A is a schematic representation of an example of a portion of a regulation version 1 or V1.

FIG. 3A is a schematic representation of an example of a portion of a regulation version 1 or V1, including Paragraph 1A and sub-paragraphs 1A-1-1A5. Sub-paragraphs 1A-5 includes sections 1A-5(1)-1A-5(3). Section 1A-5(1) includes sub-sections 1A-5(1) a-1A-5(1) c. FIG. 3B is a schematic representation of an example of an updated version of the same regulation version 2 or $V_2$, as in FIG. 3A. Paragraph 1A and its associated sub-paragraphs, and sections are the same as in FIG. 3A. In the updated version of the regulation, sub-section 1A-5(1) c is changed, as indicated by the dotted boundary in FIG. 3A, and sub-section 1A-5(1) d is added. In one example of an embodiment of the disclosure, changes from one version of a regulation to another are identified and classified, and a compliance mapping including version 1 of the regulation is updated to reflect the changes in version 2 of the same regulation.

In accordance with an embodiment of the disclosure, a compliance mapping of regulations and standards, such as the compliance mapping 50 in FIG. 2, includes live crosswalks or links so that when a regulation changes, the relevant crosswalks are automatically updated. Updating may be based on natural language processing ("NLP") and machine learning, for example. A risk analysis of the changes is also performed, and a service owner is informed of the changes and their associated risks.

Figure 4:
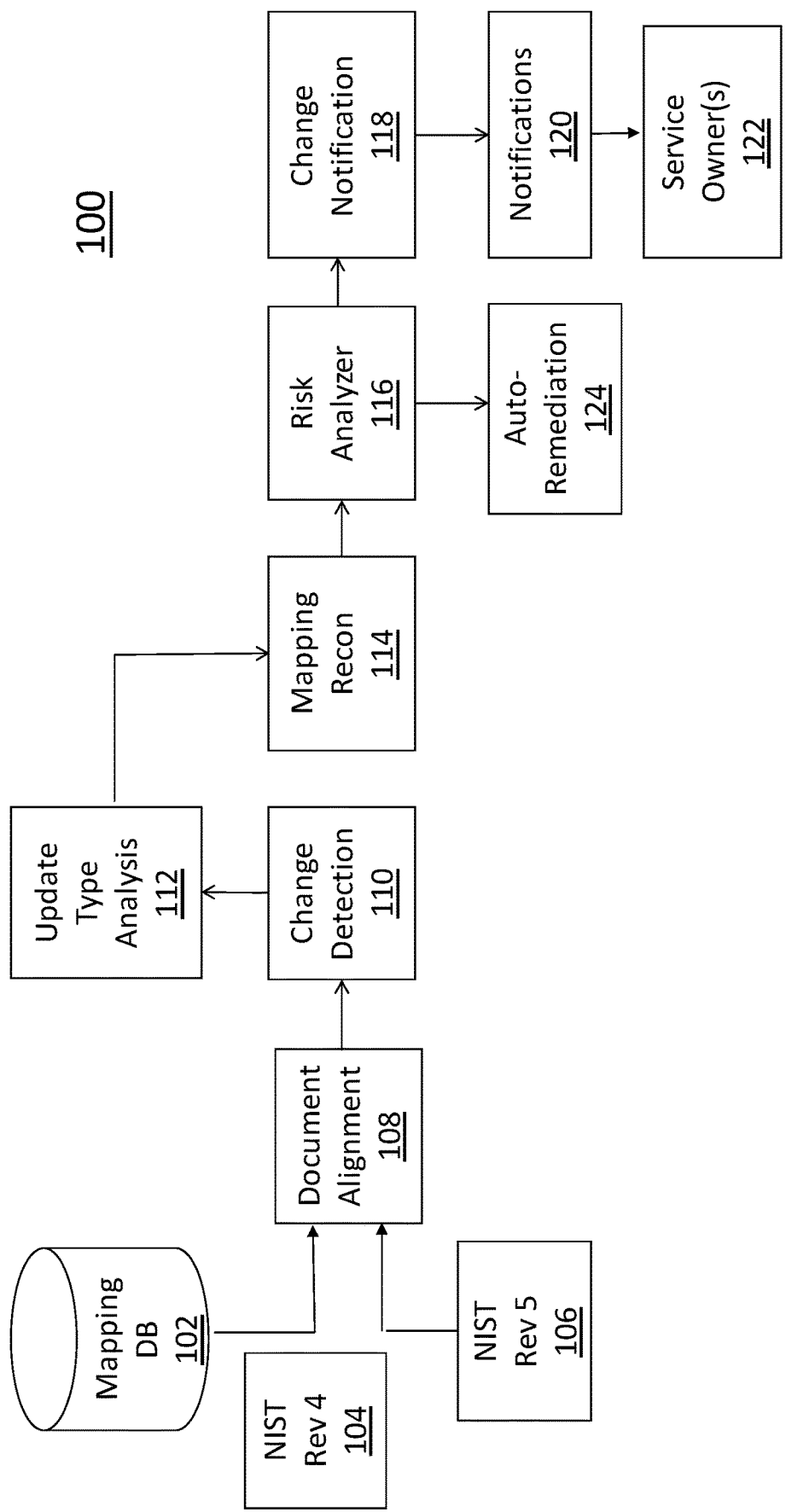
FIG. 4 is an example of functional block diagram of a process for updating a regulatory mapping, in accordance with an embodiment of the disclosure.

FIG. 4 is an example of functional block diagram 100 of a process for updating a compliance mapping, in accordance with an embodiment of the disclosure. A mapping database 102 includes one or more current mappings including one or more baseline regulations and regulatory implementations. The mapping database 102 or another database may include a library of regulations and standards, and a listing of service owners subscribing to a service for receiving updated mappings, for example. In this example the baseline of the map is NIST 800-53, revision 4 controls 104. The disclosed embodiment updates the map to reflect the changes in NIST 800-53, revision 5 controls 106 with respect to the existing compliance mapping.

NIST 800-53 revision 4 controls 104 and NIST 800-53 revision 5 controls 106 are aligned, in document alignment Block 108. Changes in the control names and changes in the control descriptions of the aligned documents are identified in change detection block 110. Changes can be identified by a lexical analysis and/or semantic analysis, for example.

The changes are classified by type by the update type analysis block 112. The types may be addition, deletion, and update with respect to the prior version of the regulation, for example. A lexical analysis and/or a semantic analysis can be performed, for example. If the change is an update, update type analysis is also performed by the update type analysis block 112 to determine the type of update. Update types can be classified as a change with no semantic change, a change with a modified action in a control description, a change with added action in a control description, or a change with a deleted action in the control description. An action is an operative part of a control description. Lexical and semantic analysis may be performed, for example.

The compliance mapping, such as the compliance mapping 50 in FIG. 2, is reconstructed based on the types of changes and whether the change is to the baseline or to the mapped regulations, in mapping reconstruction block 114. In one example, numerical representations of added baseline control descriptions are analyzed using natural language processing ("NLP") to identify potential mappings, which are confirmed by a subject matter expert ("SME"). A machine learning model may be used to map additions to the mapped regulation to the baselines, which may also confirmed by an SME. Feedback may be provided to the machine learning model based on the SME's decisions. If a control description is deleted from the baseline or a mapped regulation, links to or from the control description are deleted.

The risks of the changes are assessed by the risk analyzer Block 116. The impacted controls are identified, and risk mapping is used to categorize the degree of risk of the change. The magnitude of the risk is quantified from each affected control. Notifications are prepared in Block 118 and sent by the notifications Block 120 to service owners 122.

Auto-remediation may optionally be provided for service owners by automatically enforcing the updated control descriptions on the systems of the service owners, in Block 124. Required configurations of updated control descriptions in the baseline 54 and mapped regulations 52 may be periodically checked and if an actual state in a respective regulation is not the same as an expected state, the actual state on the system of the service owner is automatically changed to the expected state. A state may be a value of a security requirement, for example, such as a number of days before a password needs to be changed. If the number of days is changed in an updated baseline regulation 54, a service owner's system may be updated to implement the change. A respective service owner may have a policy that auto-remediation is to be performed with respect to updated baseline regulations 54 and/or updated mapped regulations 52 if the update presents a high risk, as defined in the risk analyzer block 124, for example. What is considered to be a high risk may also be determined by the service owner.

Figure 5:
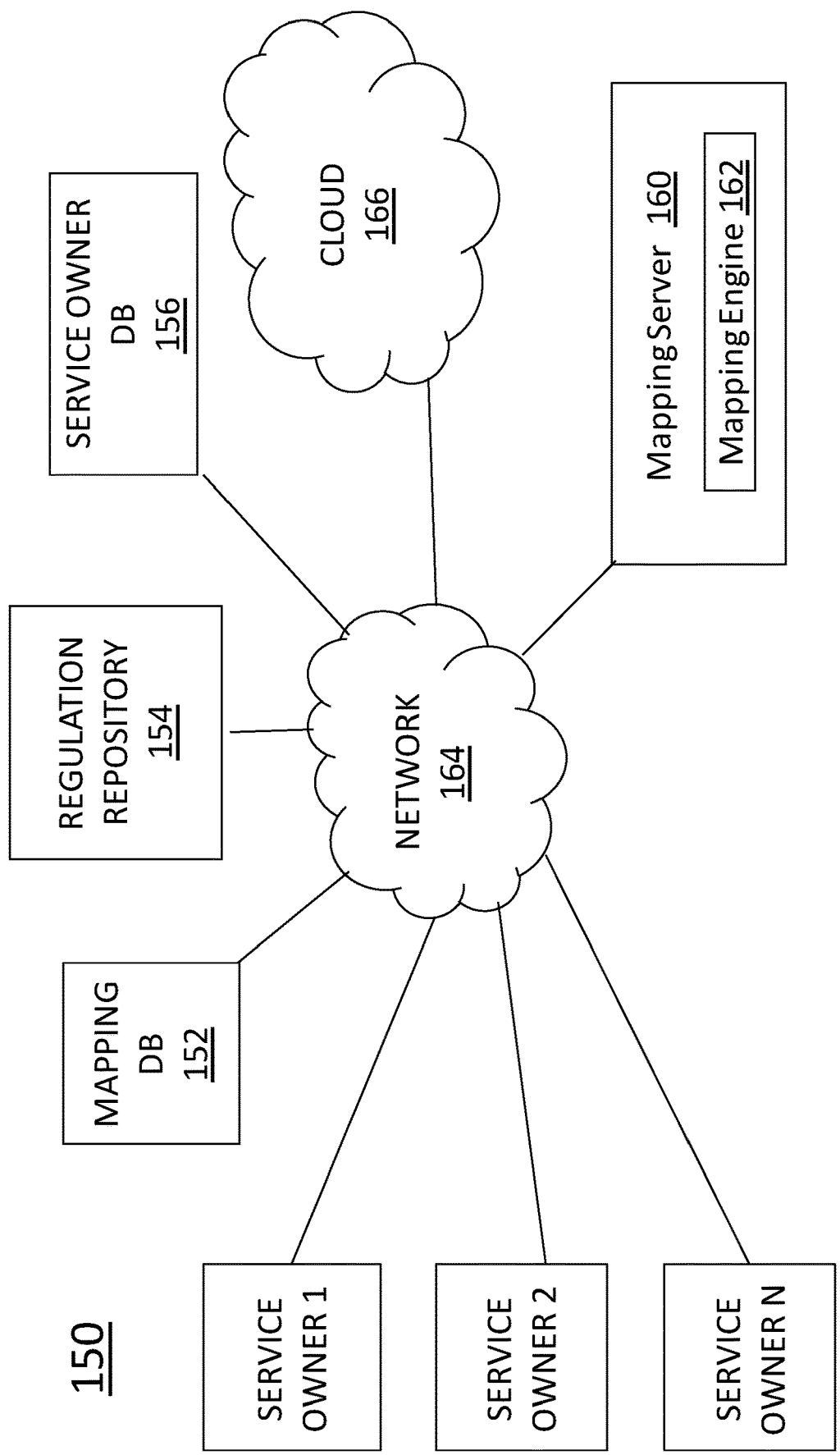
FIG. 5 is a block diagram of an example of a system that is configured to update compliance mappings based on changes in the underlying regulations and to assess the risk for service owners, in accordance with an embodiment of the disclosure.

FIG. 5 a block diagram of an example of a system 150 that is configured to update compliance mappings based on changes in the underlying regulations and to assess the risk for service owners. A mapping database 152 is configured to store and maintain current mappings of regulations with respect to baselines. A regulation repository 154 is configured to store and maintain past and present regulations that are included in the mappings in the mapping database 152. The regulation repository 154 is also configured to store updated versions of the regulations already stored in the regulation repository. New regulations may be obtained by monitoring websites dedicated to respective regulations or by receiving notification of a new regulation from such websites, for example. A service owner database 156 stores and maintains information concerning service owners 158, which in this example includes service owner 1, service owner 2 . . . service owner N, who subscribe to the system 150. The service owner database 156 stores identifying information for each service owners, preferred methods for contacting respective service owners, identifications of the regulations of interest and identifications of the compliance mappings of interest, for example. Notifications may be sent in various ways, such as common short code (CSC), using a short message service (SMS), multimedia message service (MMS), e-mail, telephone, social media, etc.

A mapping server 160 hosts a mapping engine 162 that performs the functions of the Blocks 108-124 in FIG. 4 by identifying and classifying changes between different versions of a regulation, updating compliance mappings, assessing the risk of the updates to the mappings, notifying service owners 158 of the changes and their risk, and performing auto-remediation. The mapping engine 162 may also monitor websites of regulations organizations to learn when new regulations are issued and to obtain the new regulations.

A network 164 allows the mapping server 160 to communicate with various resources connected to the network 160, such as the mapping database 152, the regulation repository 154, the service owner database 156, and the service owners 158, and the cloud 166. The network 164 may be a local area network ("LAN"), a virtual private network ("VPN"), a cellular network, the Internet, or a combination thereof, for example. The network 164 may include a mobile network that is communicatively coupled to a private network, sometimes referred to as an intranet, that provides various ancillary services, such as communication with various application stores, libraries, the Internet, and the cloud 166.

While the service owner database 156 is shown separate from the service owners 158, in another example each service owner 1, 2, . . . N could have a service owner database embedded therein. In another example, any two or more of the mapping database 152, the regulation repository 154, and the service owner database 156 can be part of the same database. In addition, the mapping database 152, the regulation repository 154, the service owner database 156, and/or the mapping service 160 may be implemented by virtual computing devices in the form of virtual machines or software containers that are hosted in the cloud 166, thereby providing an elastic architecture for processing and storage. The cloud 166 is discussed in more detail later.

Figure 6:
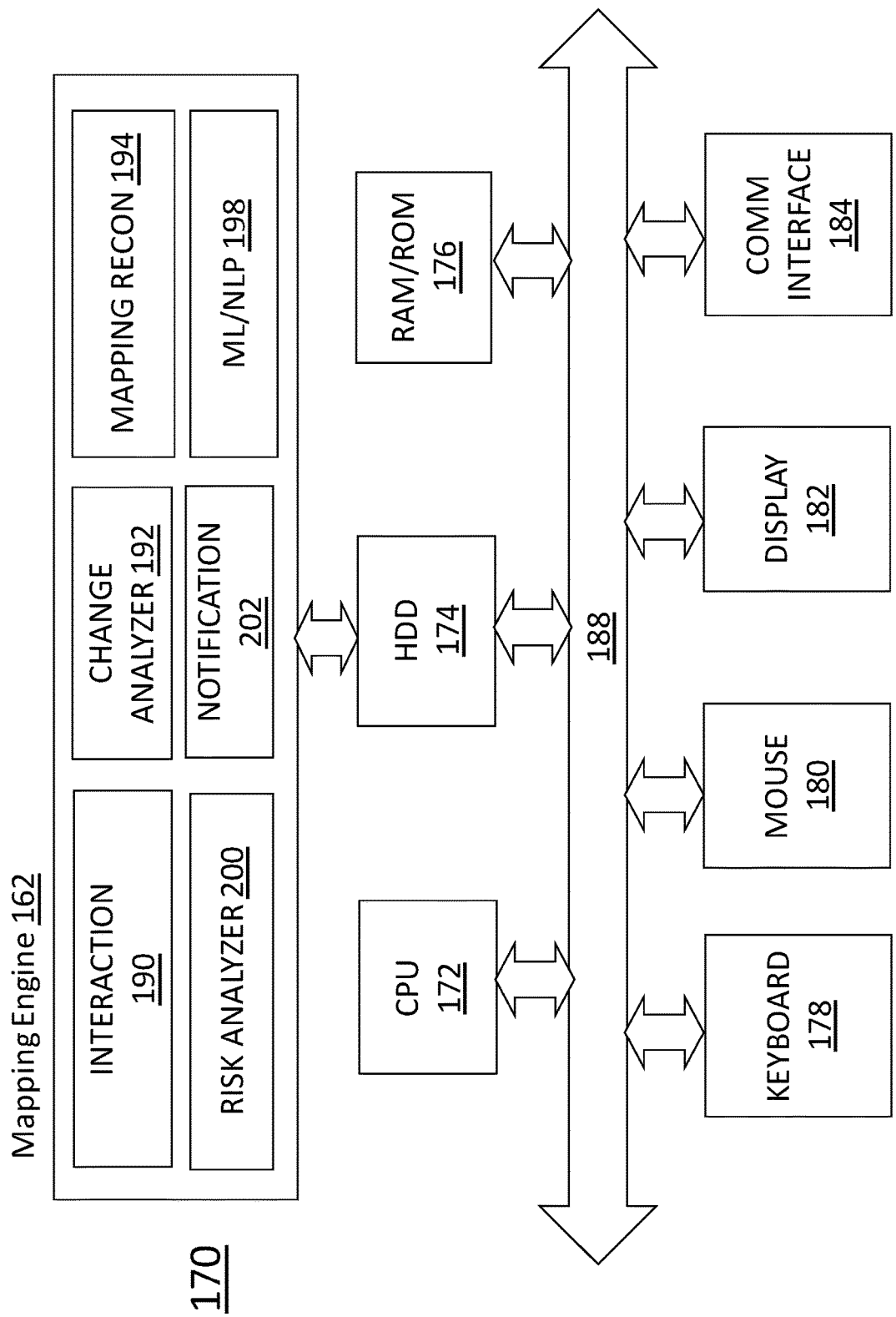
FIG. 6 is an example of a functional block diagram of a particularly configured computer hardware platform that may be used to implement the mapping server shown in FIG. 5.

Functions relating to the updating of mappings of regulations can be performed with the use of one or more computing devices connected for data communication via wireless or wired communication, for example. FIG. 6 is an example of a functional block diagram of a computer hardware platform 170, such as a network or host computer platform, that may be used to implement an appropriately configured server, such as the mapping server 160 of FIG. 5.

The computer platform 170 may include a processing device, such as a central processing unit (CPU) 172, a hard disk drive ("HDD") 174, random access memory ("RAM") and read only memory ("ROM") 178, a keyboard 178, a mouse 180, a display 182, and a communication interface 184, which are connected to a system bus 188, for example. A program that can execute various processes, such as the operations of the mapping engine 162 in a manner described herein, may be stored in a non-transitory computer readable storage medium, such as the HDD 174, for example.

The mapping engine 162 may have various modules configured to perform different functions. The modules in the mapping engine 162 may be hardware, software, or a combination of hardware and software, for example. For example, there may be an interaction module 190 that is operative to receive electronic data from various sources, including the mapping database 152, regulation repository 154, service owner database 156, the one or more service owners 158, and data provided by the cloud 166. The interaction module 190 may also be configured to send notifications messages to service owners 158 concerning the risk of updated regulations on the respective service owner 1, service owner 2 . . . service owner N, as discussed above with respect to Block 120 of FIG. 4.

A change analyzer module 192 in this example performs document alignment, change detection, and update type analysis of blocks 108, 110, and 112 of FIG. 4, for example. Document alignment aligns a current version of a regulation, such as NIST 800-53 Rev. 4, with an updated version of the regulation, such as NIST 800-53 Rev. 5. Document alignment techniques are known in the art. IBM® Watson™ Compare and Comply may be used, for example.

Change detection determines whether there is an addition, a deletion, or an update in Rev 5 with respect to Rev. 4, for example (see FIG. 4). Update type analysis characterizes the change as no change semantically, change with modified actions, change with added actions, or change with deleted action, for example. In another example, separate modules may be provided for the document alignment, change detection, and/or the update type analysis.

A mapping reconstruction module 194 in this example reconstructs a compliance mapping when a mapped regulation and/or the baseline regulation are changed, as in block 114 of FIG. 4. A machine learning/natural language ("ML/NLP") module 198 may be provided for machine learning and natural language processing that is used by the change analyzer module 192 and/or the mapping reconstruction module 194, as discussed further below. Alternatively, the function of the ML/NLP 198 may be part of the change analyzer module 192, and/or the mapping reconstruction module 194. The ML/NLP module 198 is operative to learn from prior interactions with compliance mappings, during a training phase, to identify semantic changes and to create potential new links in a compliance mapping, for example, as described in more detail below.

A risk analyzer module 200 may be provided to determine a compliance risk associated with each change in the mapping and gaps in the mapping due to changes in regulations, as in block 116 of FIG. 4. The risk analyzer module walks through the compliance mapping to find such gaps, which may be caused by controls being missing after the change. The risk analyzer module 200 then assesses the risk for each gap and notifies the service owners about the risk the possess.

A notification module 202 may also be provided to send notifications to service owners 158 of risks determined by the risk analyzer module 200. In another example, the risk analyzer module 200 may send the notifications, for example.

While the change analyzer module 192, the mapping reconstruction module 198, and the risk analyzer module 200 are part of the one computer platform 170, separate computer platforms may be provided for one or more of the modules. In addition, the functions of the change analyzer module 192, the mapping reconstruction module 198, and the risk analyzer module 200 may be part of one module or two separate modules.

A program, such as Apache™, can be stored for operating the system as a Web server. In one embodiment, the HDD 174 can store an executing application that includes one or more library software modules, such as those for the Java™ Runtime Environment program for realizing a JVM (Java™ virtual machine).

Example Processes

Examples of processes of embodiments of the disclosure for updating compliance mappings are described with respect to the flowcharts of FIG. 7A-FIG. 13C. The processes may be performed by the modules of the mapping engine 162, for example. It will be understood that each block of the flowchart illustrations and/or block diagrams, and combinations of blocks in the call flow illustrations and/or block diagrams, can be implemented in hardware, software, or a combination thereof. In the context of software, the blocks represent computer readable and executable program instructions that, when executed by one or more processors, perform the recited operations. Generally, computer executable instructions may include routines, programs, objects, components, data structures, and the like that perform functions or implement abstract data types.

Change Identification—Changes in Control Names

One type of change in regulations from one version to another that can be identified in accordance with an embodiment of the disclosure is changes in control names, which are the headings or titles of sections of the regulations. Control names are typically short phrases of 2-6 words in length, for example. Changes in control names may be determined by lexical analysis, for example.

Figure 7A:
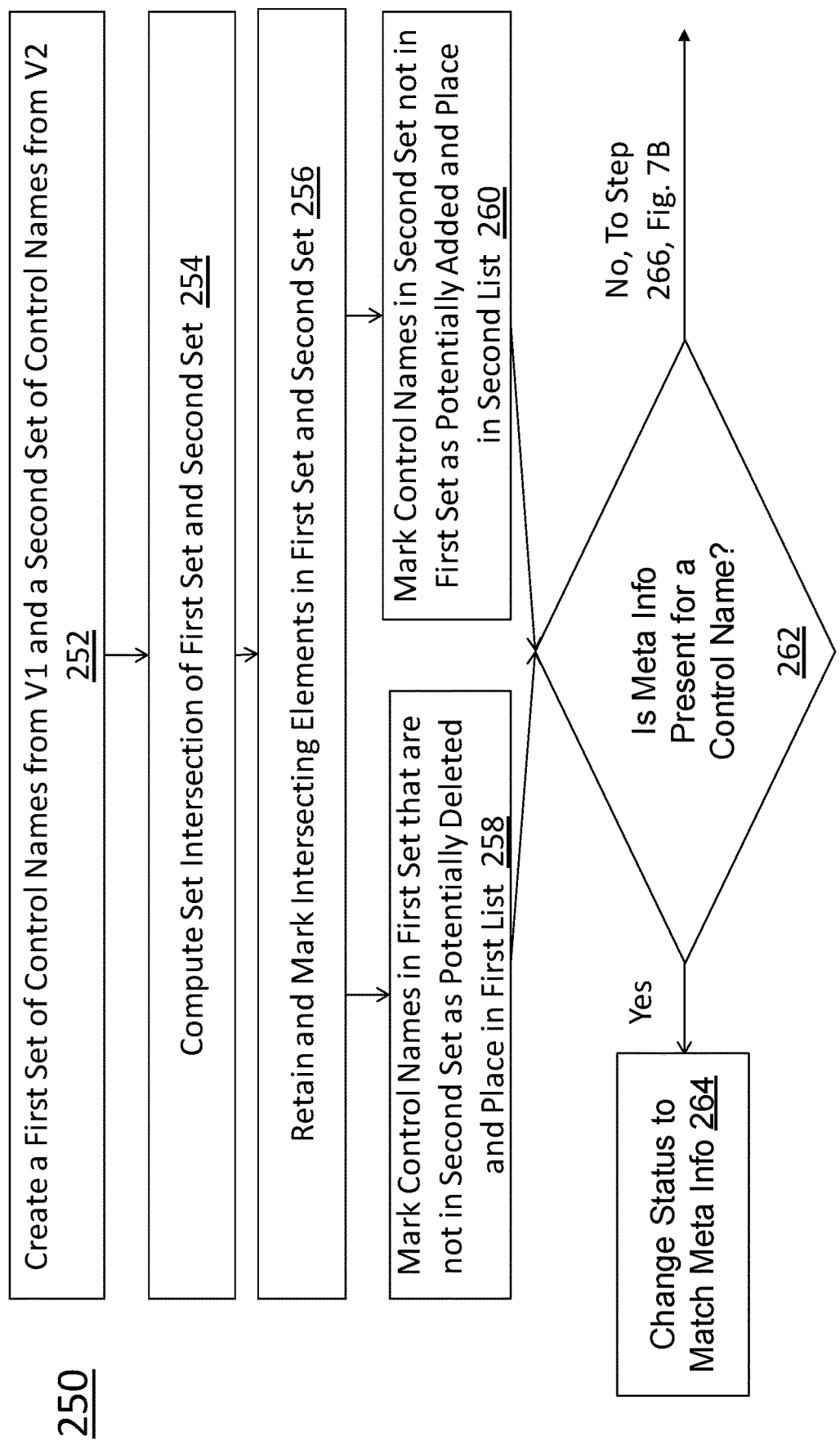
FIG. 7A and FIG. 7B are a flowchart of an example of a process for identifying changes in control names between different versions of regulation, in accordance with an embodiment of the disclosure.
Figure 7B:
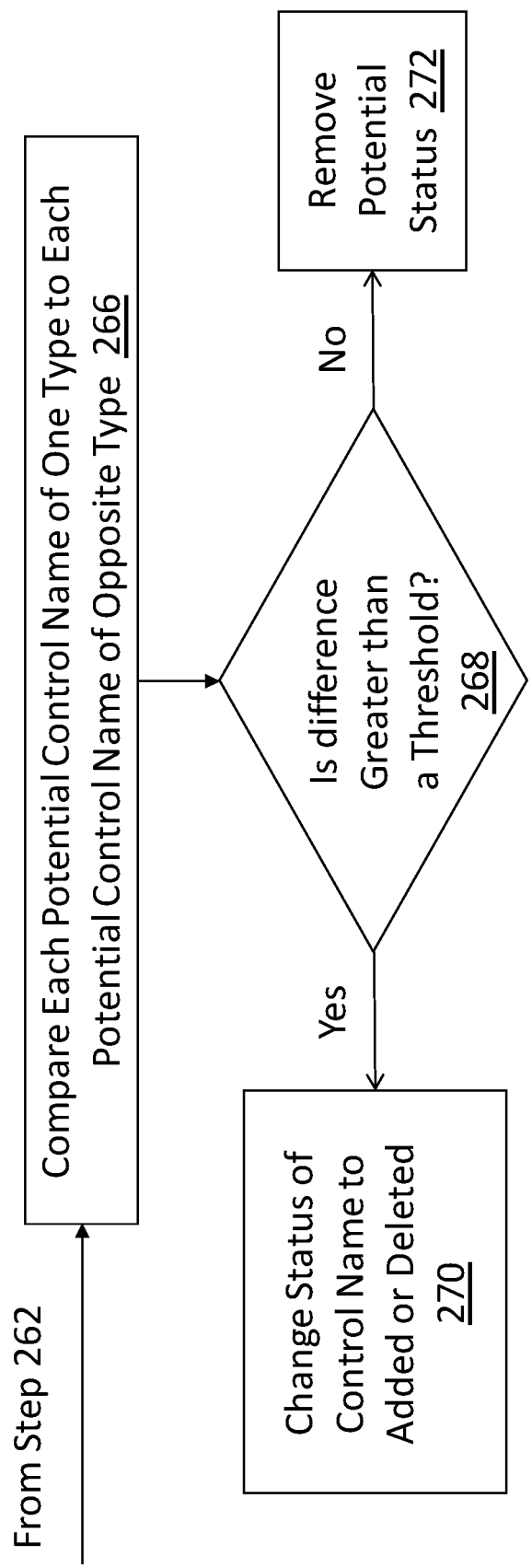

The change analyzer module 192 may identify changes between control names in different versions of a regulation by lexical analysis, for example. FIG. 7A and FIG. 7B show a flowchart 250 of an example of a process for identifying changes in control names between a first set of control names in a first regulation, such as NIST Version 1 ("V1"), and a second set of control names of a second version of the same regulation, such as NIST Version 2 ("V2"), for example. The process of FIG. 7A and FIG. 7B may be implemented by the change analyzer module 192 of the mapping engine 162, for example.

Referring to the example of the system 100 of FIG. 4, the NIST Version 1 is retrieved from the mapping database 102. In the example of the system 150 of FIGS. 5 and 6, the NIST Version 1 is retrieved from the regulation repository 154, for example. The retrieved NIST Version 1 may be stored in the RAM 176 in FIG. 6 for processing in this and other processes described below, for example. When the mapping engine 162 learns that the NIST Version 2 is issued, such as from monitoring the NIST website, for example, it retrieves the NIST Version 2 from the website and stores it in the RAM 176 for processing in this and other processes described below, for example. It also stores the NIST Version 2 in the mapping database 102 in the system 100 of FIG. 4 or the regulation repository 154 in the system 150 of FIG. 5.

A first set of control names in V1 and a second set of control names in V2, are collected from the first and second versions of the regulations, in Block 252 of FIG. 7A. An intersection of the first and second sets is computed, in Block 254. Intersecting elements, which are common to both sets, are marked as Retained and eliminated from the sets, in Block 256. Retained elements may be stored in a table in the RAM 176 or other such memory, for example.

Control names present in the first set V1 that are not in the second set V2 are marked as Potentially Deleted and placed in a first bucket or list, for example, in Block 258. Potentially Deleted control names may be identified by subtracting V2 from V1 (V1-V2), for example. The first bucket or list may be stored in the RAM 176 or other such memory, for example.

Control names in the second set V2 that are not in the first set are marked as Potentially Added and put in a second bucket or list, in Block 260. Control names added in V2 that were not present in the first set V1 may be identified by subtracting the first set V1 from the second set V2 (V2-V1). The second bucket or list may be stored in the RAM 176 or other such memory, for example.

It is determined whether meta-information indicating that a particular control name has a status as added or deleted is associated with any of the Potentially Deleted or Potentially Added control names, in Block 262. The meta-information may be text, for example. If it is determined that meta-information indicating the status of the control name is associated with the control name (Yes in Block 262), then the meta-information is used to classify the control name by changing the assigned status as Potentially Deleted or Potentially Added to match the status defined by the meta-information and those control names are removed from the buckets or lists, in Block 264.

For control names for which meta-information is not associated with the control name (No in Block 262), each Potentially Added control name is compared to each Potentially Deleted control name to determine how closely they match, in Block 266 of FIG. 7B. Lexical comparison techniques may be used, for example, such as gram matching, bag of words matching, synonym set overlap, etc. Other techniques that can be used include semantic/pragmatic blocks, such as determining distances between embedding vectors in given knowledge bases, etc., for example.

The mapping engine 162 determines whether the degree of the match between each pair of control names is greater than a threshold, in Block 268. The threshold may be determined by experimentation, for example. Machine learning may also be used by creating a machine learning model. Feedback from the SME may improve performance of the machine learning model. When the degree of match of a pair of a Potentially Added control name and a Potentially Deleted control name shows a sufficient match (Yes in Block 268), it can be determined that the control name has been modified from the first version V1 to the second version V2. Modified control names are removed from the first and second lists and marked as Updated or another suitable name, for example, in Block 270.

If it is determined that the match is less than the predetermined threshold (No in Block 268), then it is determined that the Potential status is an actual status (a Potentially Added control name has been added and a Potentially Deleted control name has been deleted). Potential status is removed from the control names in each list, in Block 272. Those control names are then considered to be Added or Deleted The changed control names may be added to the compliance mapping with the underlying changes to the control descriptions in the sections and subsections of the regulation, which are discussed below.

Changes in Control Descriptions—Update Type

Changes in control descriptions, or the text of the regulation, may be determined by lexical and/or semantic textual comparison techniques, for example. In accordance with an embodiment of the disclosure, the changes may be classified based on whether there is a change and if so, the magnitude of the change.

FIG. 8 is a flowchart 300 of an example of the use of lexical analysis to identify and classify changes in different versions of a regulation. The blocks of the flowchart 300 may be performed by the change analyzer module 192 of the mapping engine 162, for example. Continuing the example of FIGS. 7A and 7B, described above, control descriptions are picked for the control descriptions in the second version V2 stored in the RAM 176, in Block 302. Corresponding control descriptions in the first version V1 stored in the RAM 176 are picked by the mapping engine 162 for each picked control description in the second version V2, in Block 304. The control descriptions in the first version V1 and the second version V2 are retrieved from the mapping database 102 in the system 100 of FIG. 4 and from the regulation repository 154 and/or the RAM 176 of the system 150 of FIGS. 5 and 6, for example.

The texts of the corresponding control descriptions are compared, in Block 306. The textual comparison may be performed by computing a Cosine Similarity between the texts. In Cosine Similarity, the similarity between two texts A, B sim (A, B), may be determined by converting the texts into vectors and calculating $\cos(\Theta)=A\cdot B/\|A\| \|B\|$. The texts of the control descriptions may be converted into vectors by a natural language processing ("NLP") techniques, such as one hot representation, word embedding, such as Word2Vec, Global Vectors for Word Representation ("GloVe"), an Embeddings from Language Models ("ELMo"), or Bidirectional Encoder Representations from Transformers ("BERT), for example. The smaller the value of $\cos(\Theta)$, the less similarity there is between the texts A, B. Similarity between texts may also be determined by Jaccard Similarity, for example. Word embedding and language modeling techniques may also be used to compare the texts, such as Word2Vec or GloVe, for example.

Based on the comparison, in Block 306, it is determined whether there is a difference between the texts, in Block 308. If there is no difference (No in Block 308), then the control description in V2 is marked "0" for unchanged. If there is a difference (Yes in Block 308), then the control description is classified based on the magnitude of the difference as 1, 2, or 3, in Block 312, where "1" indicates a change with modified action (requirement of the control description is modified), "2" indicates a change with added action (the control description includes an added requirement), and "3" indicates a change with deleted actions (a requirement of the control description is deleted). The classifications may be stored in the RAM 176 or other such memory for later use. The thresholds may be determined based on experimentation, for example. Machine learning may also be used by creating a machine learning model. Feedback from the SME may improve performance of a machine learning model.

Changes in control descriptions may also be identified and quantified by a semantic technique using machine learning. A machine learning model may be trained to capture whether a change from a first control description $t_i$ to a second control description $t_j$ by using examples of $t_i$ and $t_j$ that are converted into vectors that have previously been mapped to classifications described above, where 0 indicates no semantic change, 1 indicates change with modified action, 2 indicates a change with added actions, and 3 indicates a change with deleted actions.

The machine learning model may be a support-vector machine ("SVM") learning model, a neural network, or a deep neural network, for example. The control descriptions may be converted into respective vectors by using a natural language processing ("NLP") technique, such as one hot representation, Word2vec, glove, ELMo, or BERT, for example, for example.

FIG. 9 is a flowchart 326 of an example of a semantic technique to classify changes in control descriptions semantically using the machine learning model. The machine learning model may be created based on examples of control descriptions that have been converted to vectors and previously mapped to classifications 0, 1, 2, 3, as discussed above with respect to FIG. 8. The texts may be converted into vectors by a natural language processing ("NLP") technique, such as one hot representation, word embedding, such as Word2Vec, GloVe, ELMo, or BERT, for example, as discussed above. The blocks of the flowchart 326 may be performed by the ML/NLP module 198 of the mapping engine 162, for example.

Two versions of a control description $t_1$, $t_2$ are selected by the mapping engine 162, in Block 328, where $t_1$ is the current version of the control description and $t_2$ is the new version of the control description. The selected control descriptions $t_1$, $t_2$ are converted into vectors $v_1$, $v_2$ by the language modeling techniques discussed above, for example, in Block 330.

The change from $t_1$ to $t_2$ is classified as 0, 1, 2, 3 by the machine learning model, in Block 332. The control descriptions $t_1$, $t_2$ and the classifications of the change from $t_1$ to $t_2$ are stored in a table in the RAM 176, for example, in Block 334.

Mapping Reconstruction

After the update type analysis, the mapping reconstruction module 198 of the mapping engine 162 reconstructs the mapping, based, at least in part, on determinations made in other modules, as discussed below.

It is first determined whether a respective control description in the updated regulation is updated, deleted, or added with respect to the prior version of the regulation. The status of a control regulation as deleted or added can be determined by the mapping engine 162 based on the classification of the control name, as described above with respect to FIG. 7A and FIG. 7B. If a control name in V2, for example, is added with respect to V1, the corresponding control name is added. If a control name is deleted in V2 with respect to V1, the corresponding control name is deleted.

A current compliance mapping including the regulation being processed is retrieved from the mapping database 102/152. Links in the compliance mapping between control descriptions of the baseline and control descriptions of the mapped regulations that are unchanged are maintained. Links in the retrieved compliance mapping from a deleted control description in the baseline or a deleted control description in mapped regulations are removed in the updated compliance mapping by the mapping reconstruction module 194 of the mapping engine 162.

Figure 10:
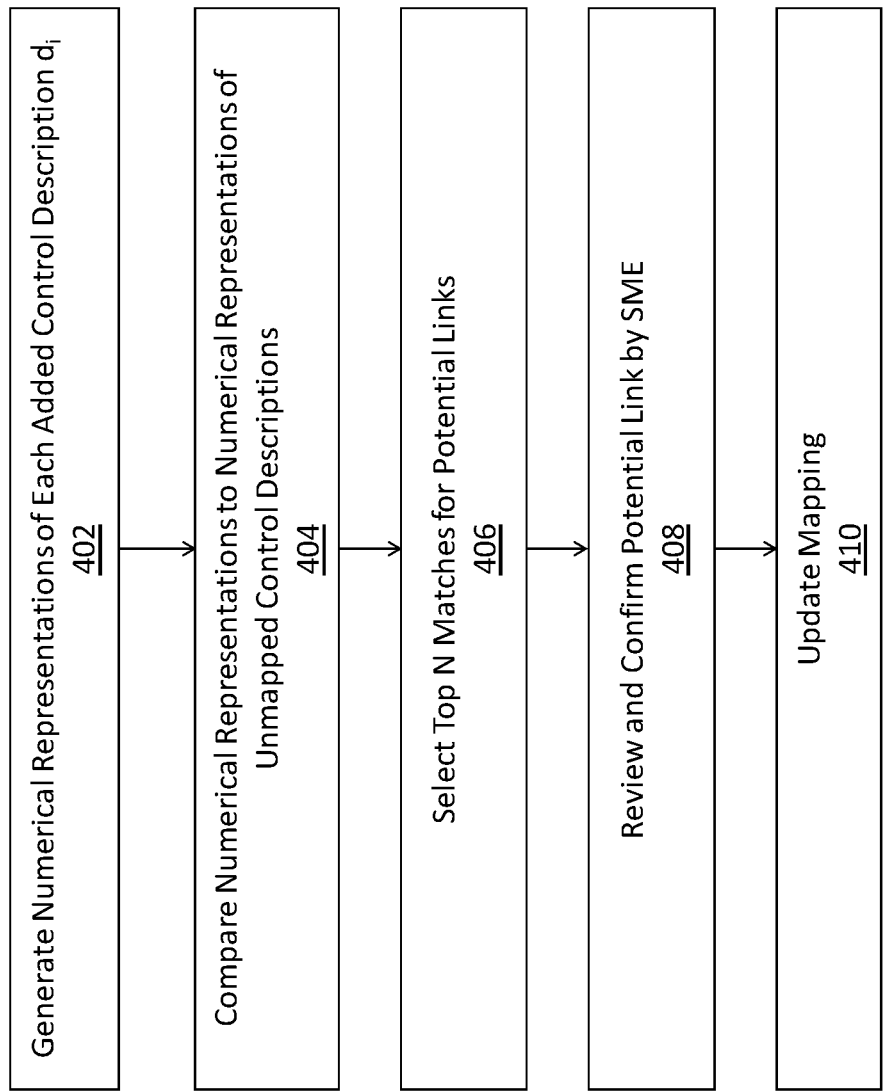
FIG. 10 is a flowchart of an example of a method for mapping reconstruction of a compliance mapping to include a control description added to the baseline, in accordance with an embodiment of the disclosure.

FIG. 10 is a flowchart 400 of an example of a method for mapping reconstruction of a compliance mapping to include a control description added to the baseline, in accordance with an embodiment of the disclosure. The blocks of the flowchart 400 may be performed by the ML/NLP module 198 and the mapping reconstruction module 194 of the mapping engine 162 of FIG. 6, for example.

Numerical representations of each control description $d_i$ are generated, in Block 402. The numerical representations may be stored in RAM 176 or other such memory, for example. The numerical representations may be generated by one or more natural language processing ("NLP") techniques, such as one hot representation, word2vec, glove, ELMo, or BERT, for example, as discussed above, by the ML/NLP module 194, for example.

The numerical representations are then compared to numerical representations of each unmapped control description of the mapped regulations, in Block 404. The comparison and subsequent blocks in the flowchart 400 may be performed by the mapping reconstruction module 194, for example. The numerical representations are only compared to the unmapped control descriptions in the mapped regulations because in this embodiment, it is assumed that the mappings of existing control descriptions are not changed by the addition of a new control description to the baseline regulation. Numerical values of unmapped control descriptions, or all control descriptions, may be previously generated and stored in the regulation repository 154 of FIG. 5, for example, or the numerical values of unmapped control descriptions may be generated prior to be needed in the present process and stored in RAM 176 or other such memory, for example.

The top N matches are selected as potential links from the added control description in the baseline to the unmapped control descriptions of the mapped regulations in the compliance mapping, in Block 406. The number of potential links N may be based on the number of mapped regulations, expense, and past experience in selecting possible candidates for mapping. The number of selections N may be 10 or 20, for example. Machine learning may also be used to determine the value of N, by creating a machine learning model. Feedback from the SME may improve performance of the machine learning model.

Top N selections are reviewed by an SME who confirms which potential links should be added to the compliance mapping, in Block 408. The compliance mapping is updated based on the confirmation by the SME by adding links by the mapping reconstruction module 194, for example, in Block 410. The use of NLP learning greatly decreases the number of potential links that need to be considered by an SME, saving significant time and improving reliability.

Figure 11:
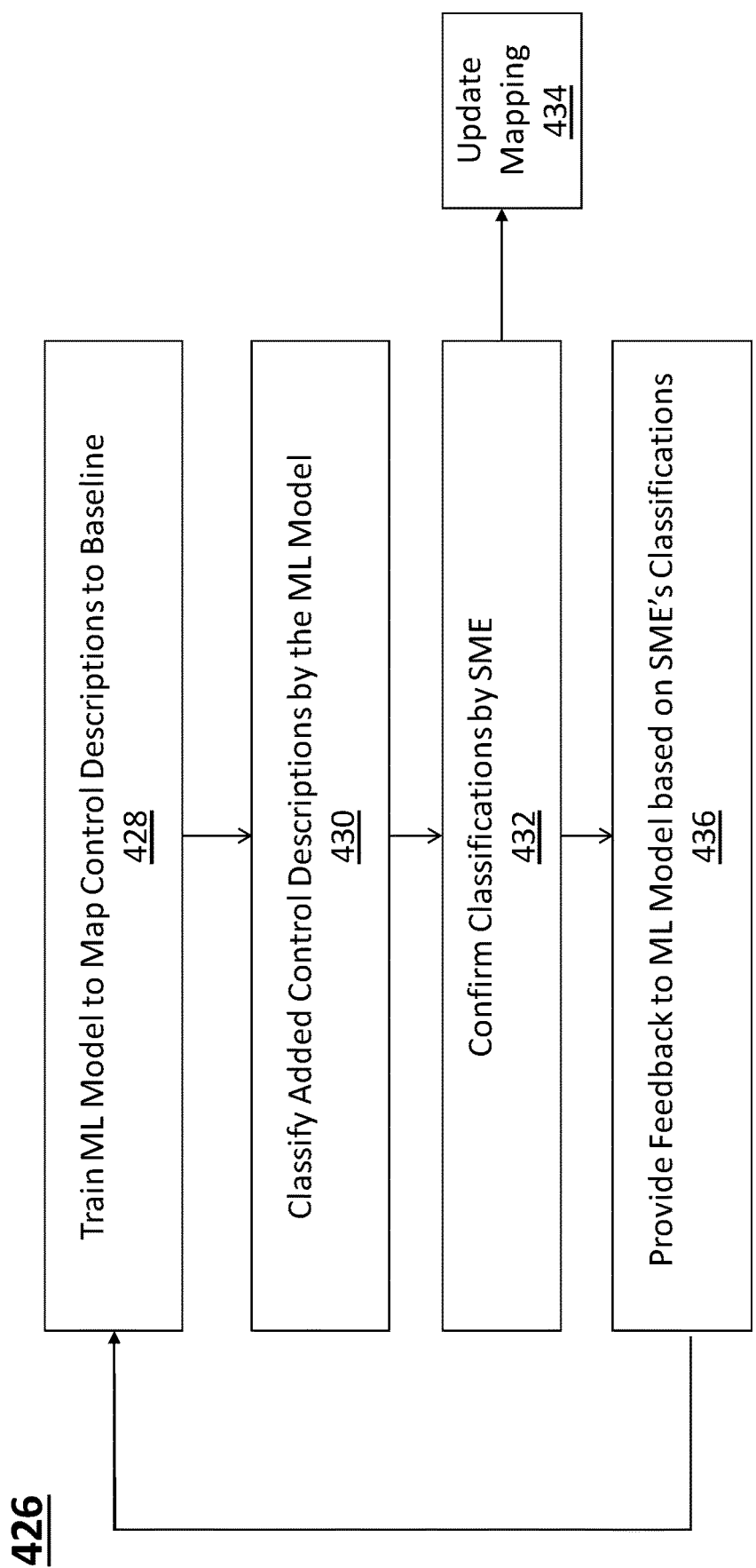
FIG. 11 is a flowchart of an example of mapping reconstruction for control descriptions added to a mapped regulation, in accordance with an embodiment of the disclosure.

FIG. 11 is a flowchart 426 of an example of mapping reconstruction for control descriptions added to a mapped regulation, in accordance with an embodiment of the disclosure. The blocks of the flowchart 426 may be performed by the mapping reconstruction module 194 and the ML/NLP module 198 of the mapping engine 162, for example. Using all the available compliance mapping(s), a machine learning model is trained to map a given control description to the baseline, in Block 428, by the ML/NLP module 198 of FIG. 6, for example. The machine learning model may be a support-vector machine ("SVM") learning model, a neural network, or a deep neural network, for example. Learning may take place during setup of the system 150 of FIG. 5 or when a control description is added to a mapped regulation, for example.

The added control descriptions are classified by the machine learning model by classifying or identifying potential links to the baseline regulation, in Block 430. The classifications are confirmed by an SME, in Block 432. The mapping is updated by adding links based on the classifications confirmed by the SME, by the mapping reconstruction module 194 of FIG. 6, in Block 434 of FIG. 11.

In addition, the SME's decisions are used as feedback to the machine learning model to provide active learning by the ML/NLP module 198, for example, in Block 436. After sufficient feedback, the SME's involvement may be decreased and may eventually not be needed. By decreasing the involvement of the SME by the use of machine learning, the speed and accuracy of the updating of compliance mapping due to new regulations is greatly increased, with greater reliability, than is was performed exclusively by an SME.

Figure 12A:
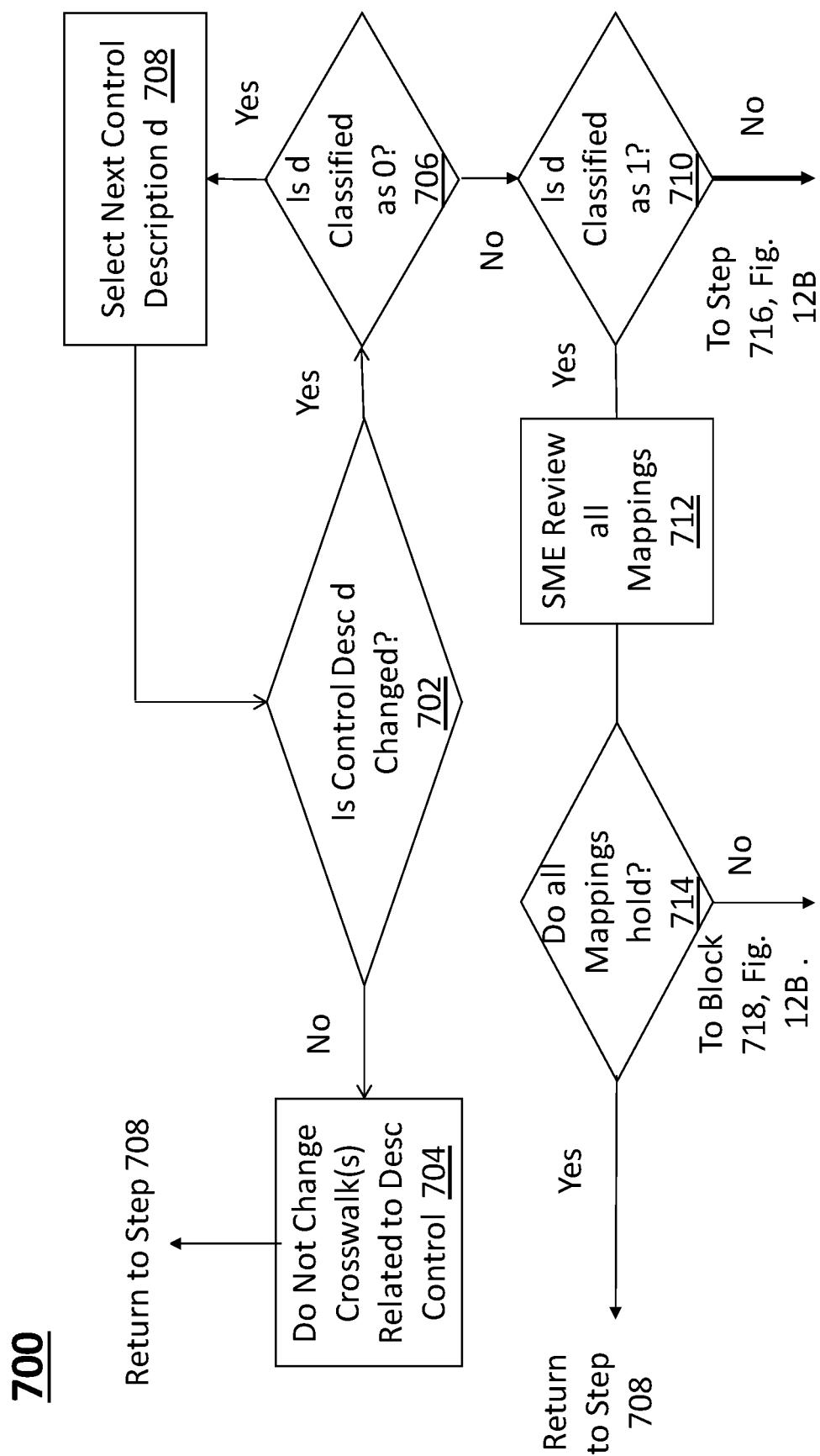
FIGS. 12A, 12B, and 12C show a flowchart of an example of mapping reconstruction for an update to a control description of the baseline, in accordance with an embodiment of the disclosure.
Figure 12B:
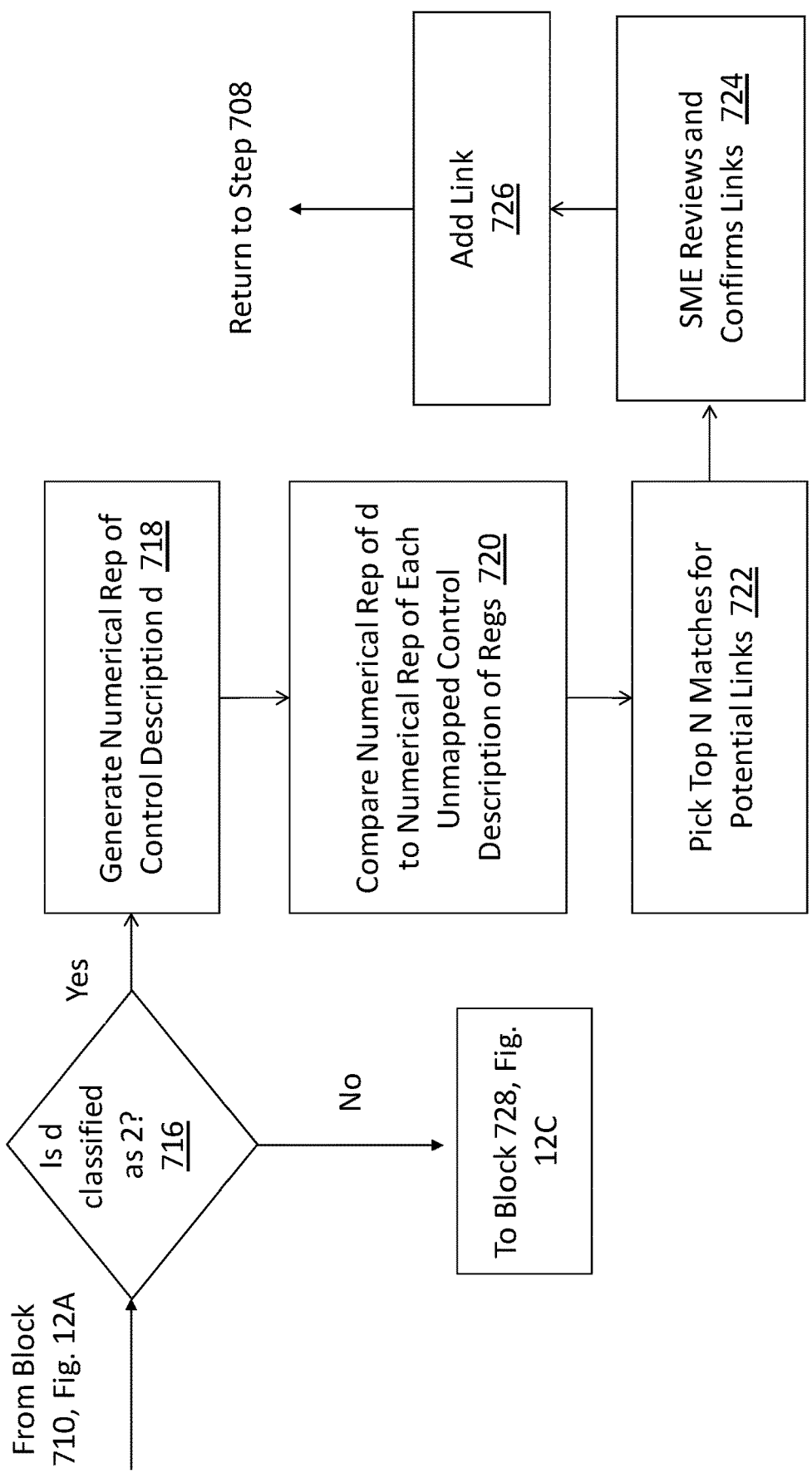
Figure 12C:
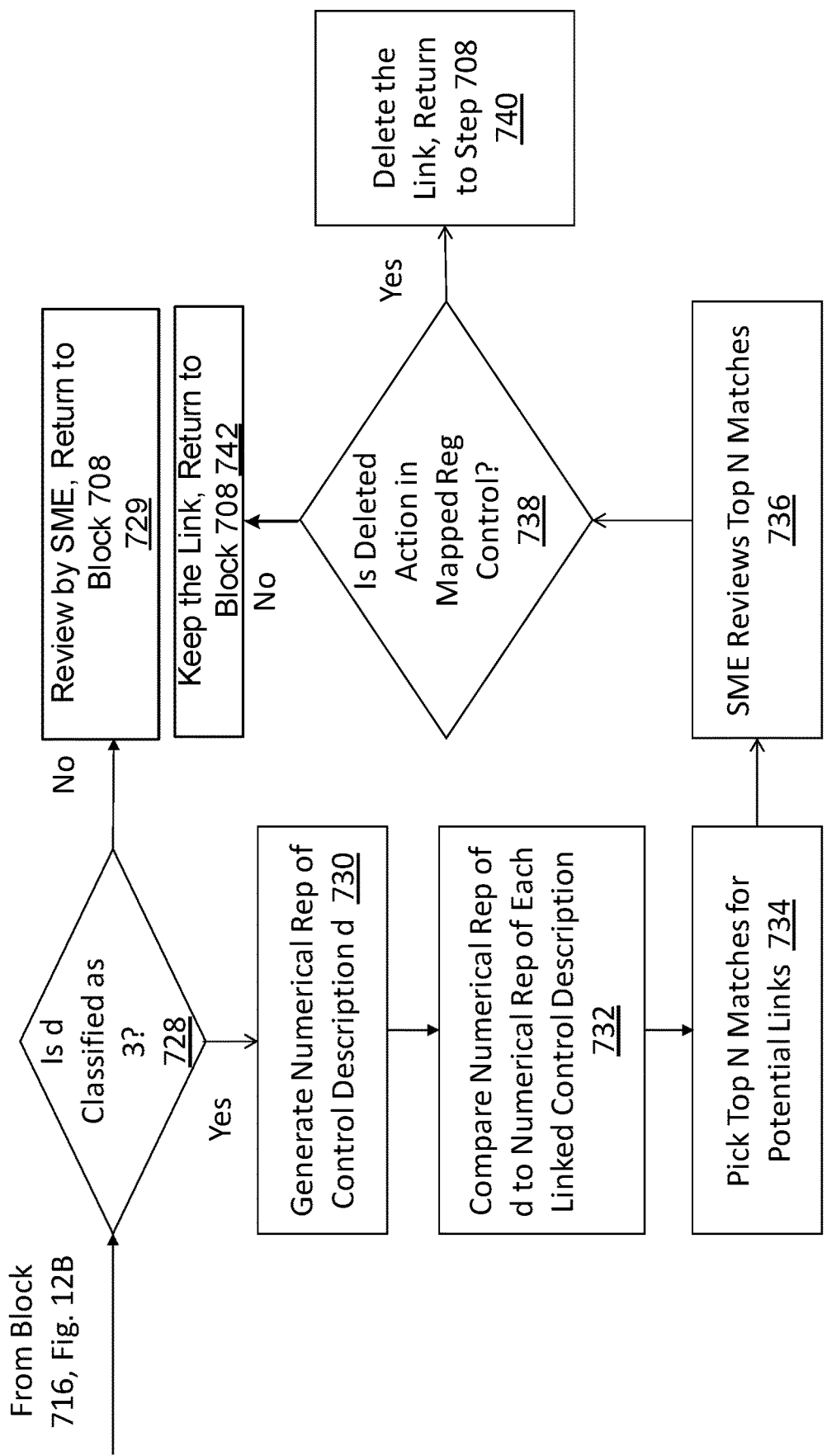

FIGS. 12A, 12B, and 12C show a flowchart 700 of an example of mapping reconstruction for an update to a control description of the baseline, in accordance with an embodiment of the disclosure. The blocks of the flowchart 700 may be performed by the ML/NLP module 198 and the mapping reconstruction module 194 of the mapping engine 162 of FIG. 6, for example. The mapping reconstruction is based on the classification of the update as 0-indicating no semantic change, 1-indicating change with modified action, 2-indicating a change with added actions, and 3-indicating a change with deleted actions. Classification of the control descriptions was described above in relation with FIG. 8 and FIG. 9, and may be retrieved from the RAM 176 or other such memory where the classifications were stored.

In this example, it is determined whether a control description d is changed, in Block 702. If the control description d is not changed (No in Block 702), the crosswalks between the regulatory documents are unchanged, in Block 704. Thereafter, the process proceeds to select the next control description for consideration, in Block 708, and determines whether there is a change in that control description, in Block 702. If the control description d is changed (Yes in Block 702 of FIG. 12A), subsequent Blocks of the process depend on the classification of the change. Whether the control description is changed, and the classification of the change, were previously determined by the change analyzer module 192, for example. It is determined whether d is classified as 0 for a change that does not introduce a semantic difference, in Block 706. If Yes, then there is no change to the related crosswalks, the process proceeds to select the next control description for consideration, in Block 708, and determines whether there is a change in that control description, in Block 702. Blocks 704, 706, and 708 may be performed by the mapping reconstruction module 194, for example.

If it is determined that the classification of the control description is not 0 (No in Block 706), it is determined whether the classification is a 1, indicating a change with modified action, in Block 710. If it is determined that the classification is 1 (Yes in Block 706), the SME reviews all the mappings from the control classified as 1 and determines whether the existing mappings or links still hold, in Block 714. If Yes, the process returns to Block 708 to consider the next control description. Blocks 710 and 714 may be performed by the mapping reconstruction 194, for example.

Returning to Block 710, if it is determined that the control description d is not classified as 1, the process proceeds to Block 716 in FIG. 12B to determine whether the control description is classified as 2. If Yes, a numerical representation of the control description is generated, in Block 718. Blocks 718 may be performed by the ML/NLP module 198, for example. As above, the numerical representation may be generated by an NLP technique, such as one hot representation, word2vec, glove, ELMo, or BERT, for example. As discussed above, numerical representations of all control descriptions may have been previously generated and stored in the regulation repository, for example, or the numerical representations of the unmapped control descriptions may be generated during the process 700. The numerical representations of the unmapped control representations may be generated by the same NLP and machine learning technique that was used to generate the numerical representation of the control description d.

The numerical representation is compared to a numerical representation of each unmapped control regulation of each mapped regulation, in Block 720. The comparison in Block 720 may be performed by the mapping reconstruction engine 194, for example. The top N matches may be selected for potential links, in Block 722. As above, N may be 10 or 20 selections, for example. N may be based on the number of mapped regulations, expense, and past experience in selecting possible candidates for mapping, for example. Machine learning may also be used, by creating a machine learning model. Feedback from the SME may improve performance of the machine learning model. The SME reviews the potential links and confirms whether to add such links to the compliance mapping, in Block 724. If machine learning is used, the SME's decisions may be used as feedback to the machine learning model to provide active learning. As above, NLP greatly reduces the number of potential links that need to be reviewed by the SME, improving speed and reliability of the process. Links confirmed by the SME are added to the compliance mapping, in Block 726. The process then returns to Block 708 to select a next control description for consideration.

Returning to Block 714 of FIG. 12A, if it is determined that all the mappings do not hold, then the process proceeds to Block 718 of FIG. 12B and proceeds as if the control description is classified as 2.

Returning to Block 716 of FIG. 12B, if it is determined that d is not classified as 2, the process proceeds to Block 728 in FIG. 12C to determine whether the classification of d is 3 for a deleted action in a control description. If it is determined that d is not classified as 3, there may have been an error in processing so d is reviewed by the SME to determine whether it should be linked to another control description(s) or whether existing links should be changed, in Block 729. The process 700 then returns to Block 708 to consider the next control description. If it is determined that d is classified as 3, a numerical representation of the control description is generated, in Block 730 by the ML/NLP module 198, for example, in the same manner as discussed above with respect to Block 718 of FIG. 12B.

The numerical representation is compared to a numerical representation of each control description linked to the control description d, in Block 732. The comparison in Block 732 may be performed by the mapping reconstruction engine 194, for example. The top N matches may be selected for potential links, in Block 734. As above, N may be 10 or 20 selections, for example, and may be based on the number of mapped regulations, expense, and past experience in selecting possible candidates for mapping. Machine learning may also be used to determine N by creating a machine learning model. Feedback from the SME may improve performance of the machine learning model. The value of N in Block 734 may be different than the value of N in Block 722 in FIG. 12B. If machine learning is used, the SME's decisions may be used as feedback to the machine learning model to provide active learning. As above, NLP greatly reduces the number of potential links that need to be reviewed by the SME, improving speed and reliability of the process.

The SME reviews the top N matching control descriptions in Block 736 and determines whether the action deleted in the control description d is also in a control description mapped or linked to the control description d, in Block 738. If Yes, then the link between the control description d and the mapped control description is deleted by the mapping reconstruction module 194, for example, in Block 740. The process then returns to Block 708 to consider another control description d. If the SME determines that the deleted action is not in the mapped control description, then no action is taken and the link is maintained, in Block 742. The process then returns to Block 708 to consider another control description d.

Figure 13A:
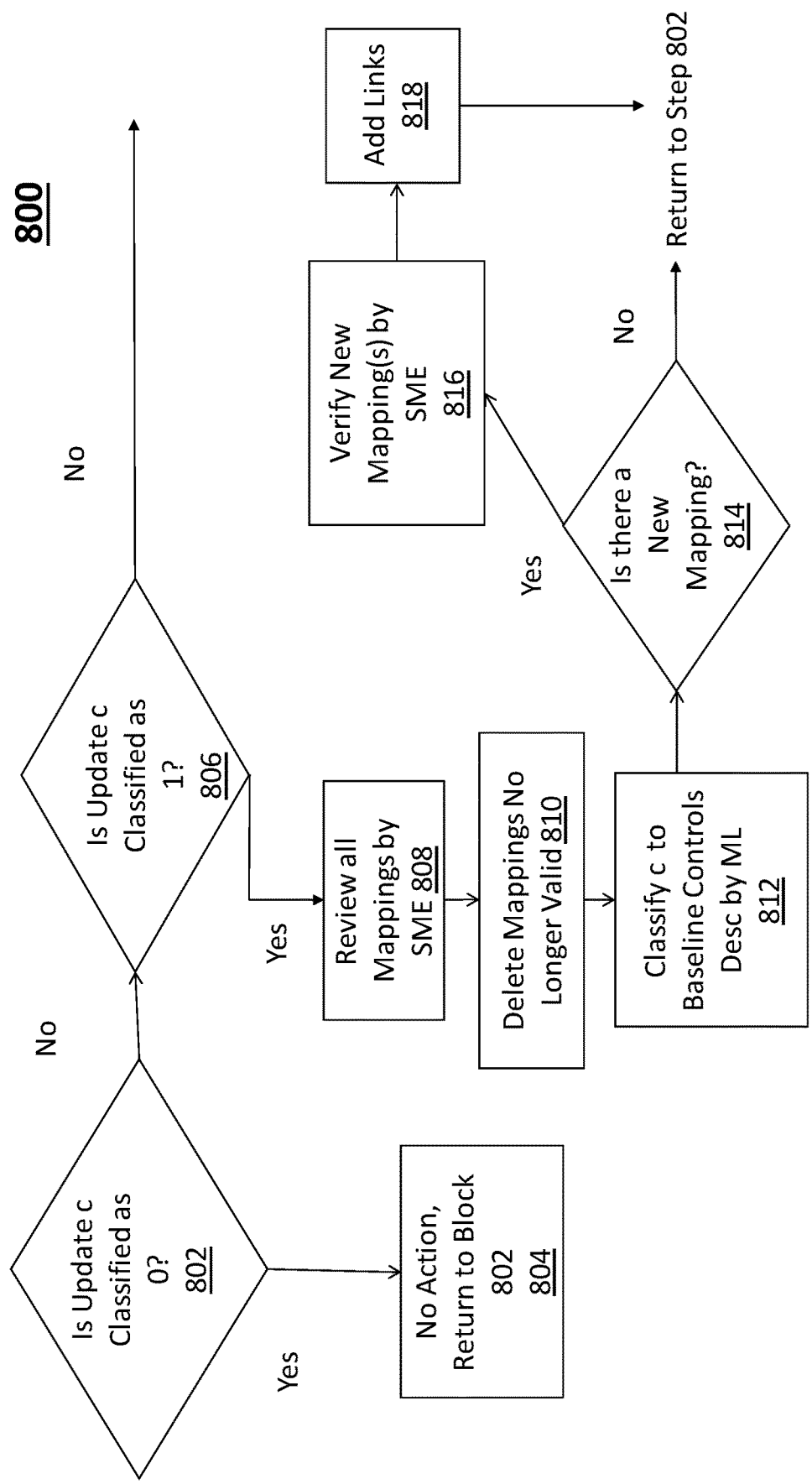
FIGS. 13A, 13B, and 13C show a flowchart of an example of a process for mapping reconstruction for an update to a control description of the baseline, in accordance with an embodiment of the disclosure.
Figure 13B:
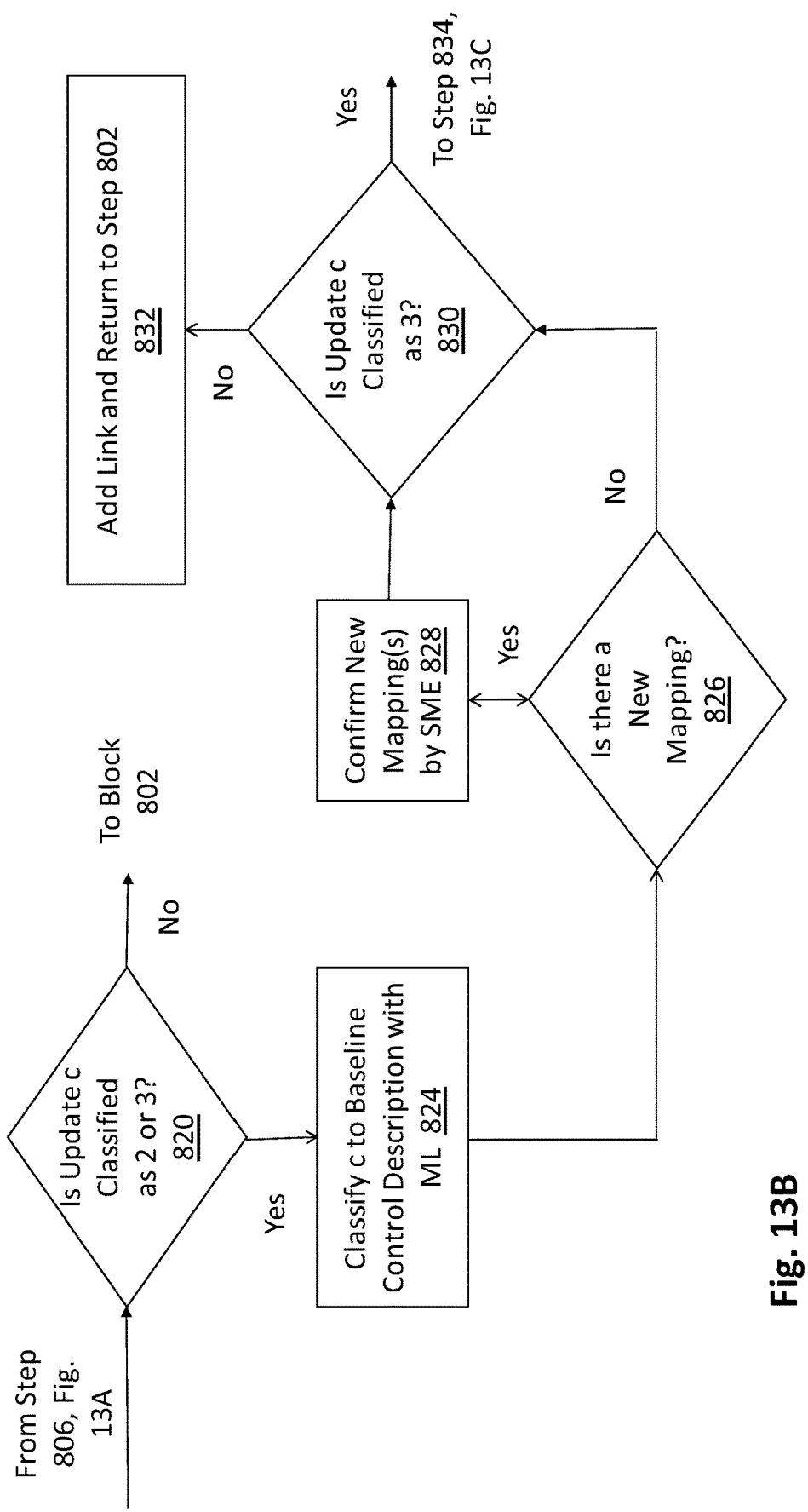
Figure 13C:
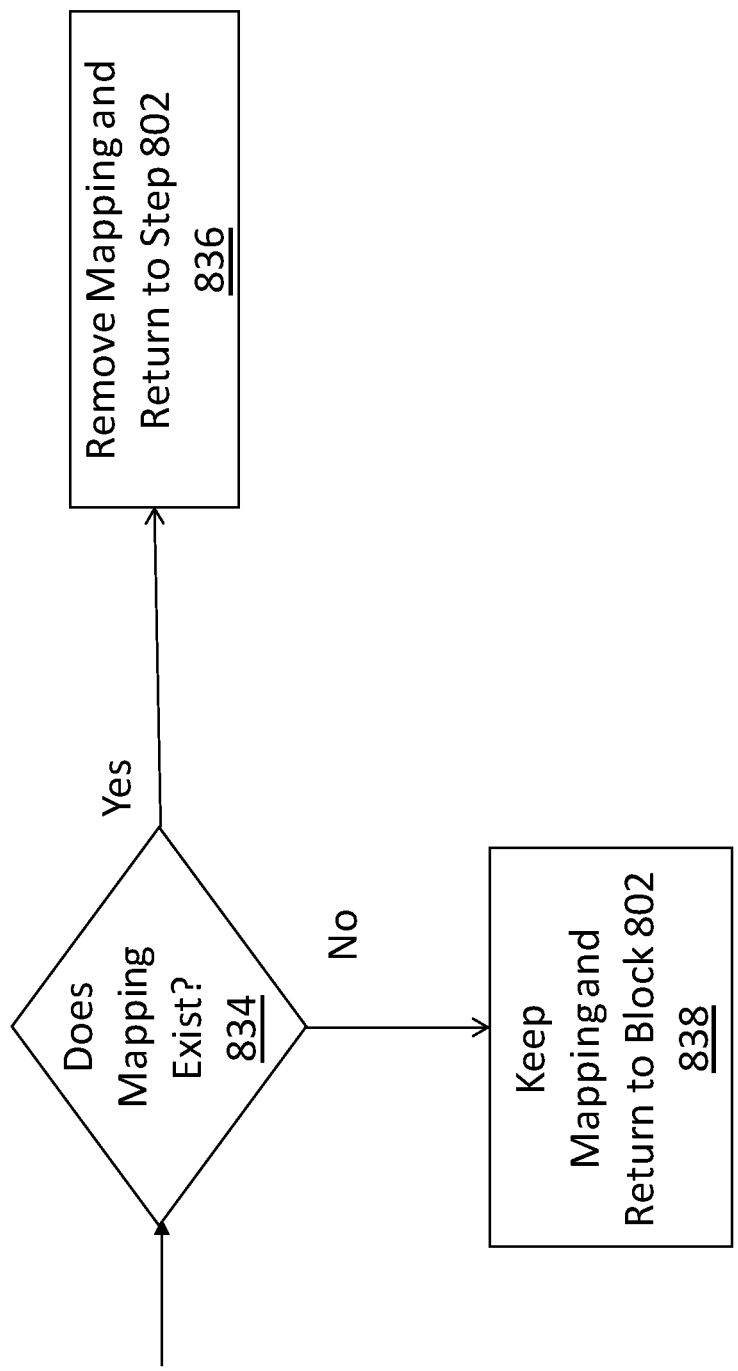

FIGS. 13A, 13B, and 13C show a flowchart 800 of an example of a process for mapping reconstruction for an update to a control description of a mapped regulation, in accordance with an embodiment of the disclosure. The compliance mapping is based on the classification of the update, which was previously determined by the change analyzer module 192, for example. Classification of the control descriptions was described above in relation with FIG. 8 and FIG. 9, and may be retrieved from the RAM 176 or other such memory where the classifications were stored. It is determined by the mapping reconstruction module 194 whether the updated control description c is classified as 0, indicating no semantic change, in Block 802. If Yes, no action is taken in Block 804 and the next control description is considered in Block 802.

If it is determined that the classification of the update c is not 0 (No in Block 802), it is determined whether the update c is classified as 1, indicating a change with modified action by the mapping reconstruction module 194, for example, in Block 806. If it is determined that the update is classified as 1 (Yes in Block 806), all the mappings are reviewed by the SME, in Block 808. The SME determines whether existing links hold, and if not, deletes links that do not hold, in Block 810.

Machine learning is used to classify the control description c to control descriptions in the baseline by the ML/NLP module 198, for example, in Block 812. The machine learning model may be trained in the same manner as discussed above with respect to the flowchart 700. It is determined whether there is a new mapping or link based on the machine learning, in Block 814. If Yes, the mapping is verified by the SME, in Block 816, and the link is added, in Block 818 by the mapping reconstruction module 194, for example. The process then returns to Block 802 to consider another updated control description. Returning to Block 814, if it is determined that there are no new mappings, then the process returns to Block 802 to consider another new updated control description.

Returning to Block 806 in FIG. 13A, if it is determined that the update c is not classified as 1, the process proceeds to Block 820 in FIG. 13B, where it is determined whether the updated control description c is classified as 2 or 3 by the mapping reconstruction module 194, for example. If No, the process returns to Block 802 to consider another updated control description c, in Block 822. If Yes, the updated control description c is classified to the baseline with machine learning in Block 824, as discussed above with respect to Block 814 in FIG. 13A. It is determined whether a new potential mapping is found, in Block 826. If it is determined that a new potential mapping is found (Yes in Block 826), then the new mapping is verified by the SME, in Block 828.

The process proceeds to Block 830, where it is determined whether the updated control description c is classified as 3 to indicate that a portion of the control description is deleted. If there are no new mappings, in Block 826, the process also proceeds to Block 830. If it is determined that the update c is not classified as 3, then a link is added between the new mapping confirmed by the SME, by the mapping reconstruction module 194, for example, in Block 832. The process then returns to Block 802 to consider another update c.

If the updated control description is classified as 3 (Yes in Block 830), then the process proceeds to Block 834 in FIG. 13C, where it is determined whether a mapping exists corresponding to the deleted portion of the control description, by the mapping reconstruction module 194. If it is determined that a mapping exists corresponding to the deleted portion of the control description, in Block 834, then the link is removed by the mapping reconstruction module 194, for example, in Block 836, and the process returns to Block 802 to consider a another updated control description. If it is determined that no such mapping exists corresponding to the deleted portion of the control description, in Block 832, then mappings from the updated control description are kept and the process returns to Block 802 to consider a new updated control description, in Block 836.

FIG. 14 is a flowchart 900 of an example of risk analysis, as performed in the risk analyzer block 116 of FIG. 4 by the risk analyzer module 200 in FIG. 6, in accordance with an embodiment of the disclosure. At a time prior to a current update, control descriptions corresponding to respective service owners 158 (FIG. 5) that are impacted by the changes are identified by the risk analyzer module 200, in Block 902. This information may be retrieved from the service owner database 156, for example. A risk map is prepared for each control description of each mapped regulation and each baseline regulation that could impact a respective service owner 158, in Block 904, by an SME, for example. The risk mapping may quantify the risk on a scale, such as a scale from 1-10, for example. The mapping of control descriptions to the risk scale may be stored in the mapping reconstruction database 152, the regulation repository database 154, or another database, for example. After receiving an update to a mapped regulation or a baseline regulation, the risks due to the changed control descriptions are quantified and aggregated by considering the maximum risk of each changed control description, by the risk analyzer module 200, based on the risk mapping, in Block 906. The service owner is notified of the aggregated risk and the changed control descriptions, in Block 908.

As discussed above, auto-remediation on a system of a respective service owner 122 may also optionally be performed. Whether to perform auto-remediation may be determined based on the results of the risk analysis, if requested by a respective service owner. The mapping engine 162 may be configured to access a system of a service owner 158 via the network 164, for example. (See FIG. 5), to perform the auto-remediation.

Example Cloud Platform

As discussed above, functions relating to managing the compliance of one or more client domains, may include a cloud 166 as shown in FIG. 5. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
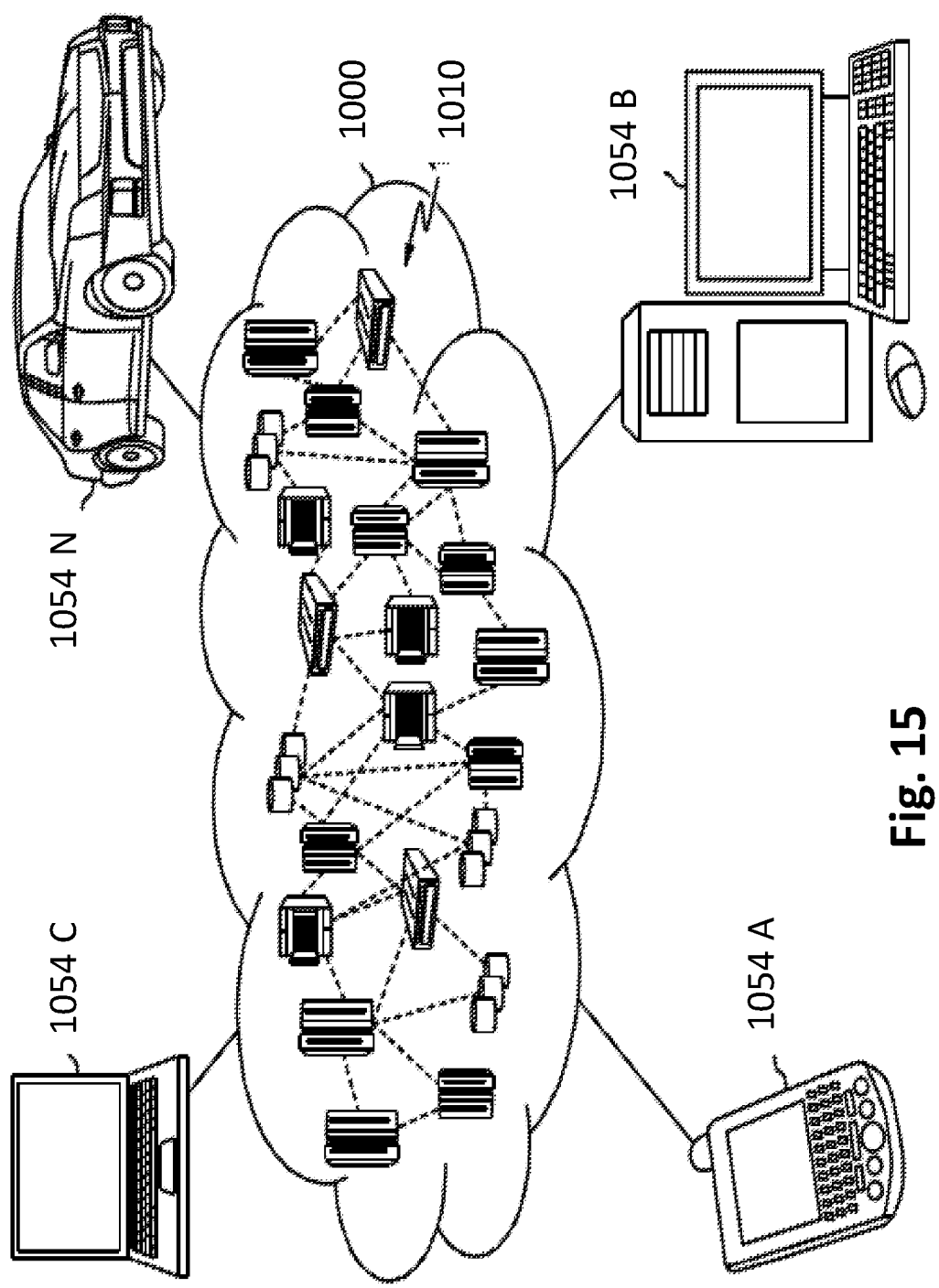
FIG. 15 is an example cloud computing environment, consistent with an illustrative embodiment.

Referring now to FIG. 15, an illustrative cloud computing environment 1000 is depicted. As shown, cloud computing environment 1000 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1054A-N shown in FIG. 15 are intended to be illustrative only and that computing nodes 1010 and cloud computing environment 1000 can communicate with any type of computerized device over any type of network and/or network addressable connection (e.g., using a web browser).

Figure 16:
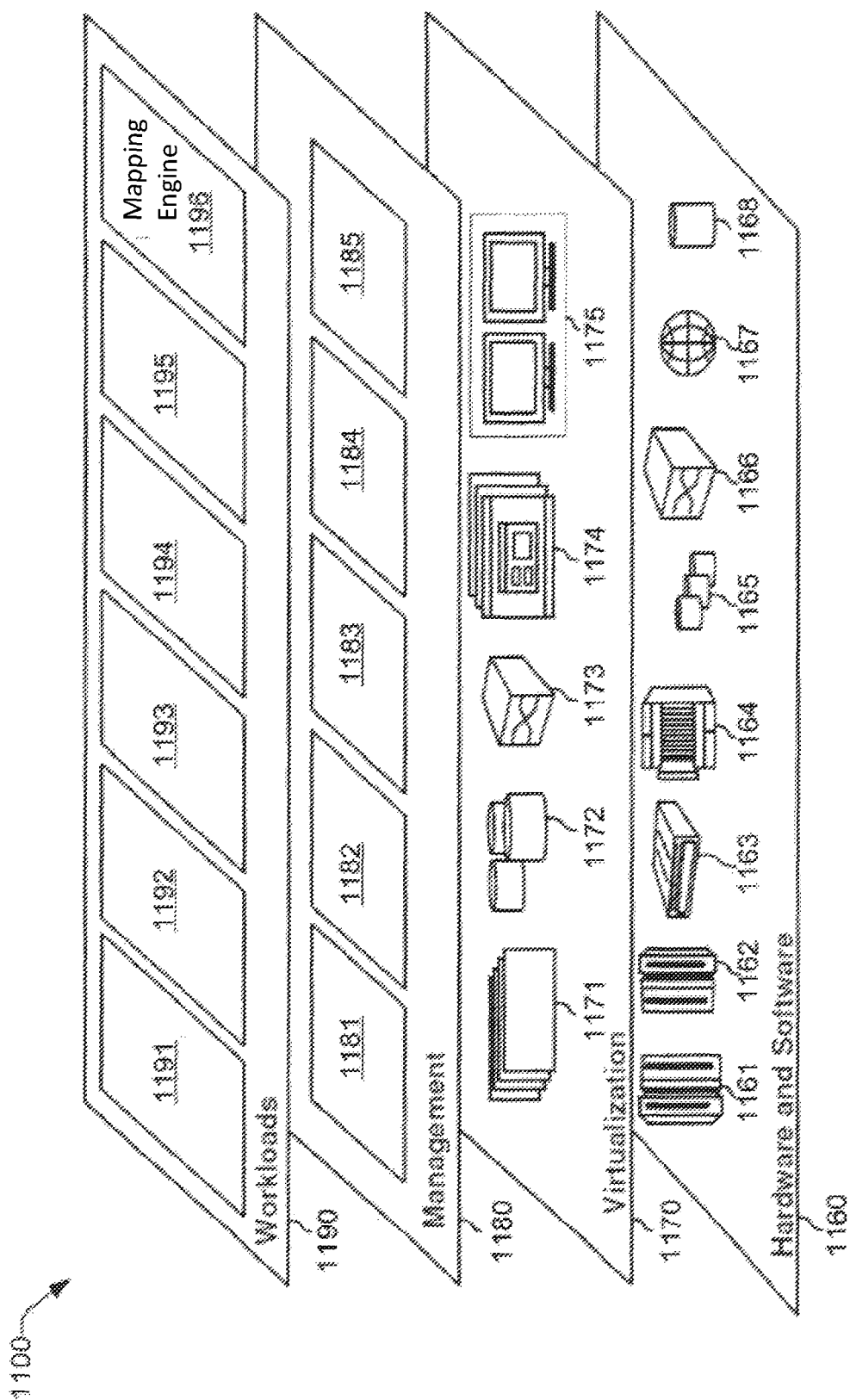
FIG. 16 is a set of functional abstraction layers provided by the cloud computing environment of FIG. 15, consistent with an illustrative embodiment.

Referring now to FIG. 16, a set of functional abstraction layers provided by cloud computing environment 1000 (FIG. 15) is shown. It should be understood in advance that the components, layers, and functions shown in FIG. 16 are intended to be illustrative only and embodiments of the disclosure are not limited thereto. As depicted, the following layers and corresponding functions are provided:

Hardware and software layer 1160 include hardware and software components. Examples of hardware components include: mainframes 1161; RISC (Reduced Instruction Set Computer) architecture-based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and mapping engine 1196, such as mapping engine 162 of FIG. 5, to identify changes and classify changes in updated baseline and mapped regulations, reconstruct compliance mappings based on the updates, and inform service owners 158 of the risks of the updates to the service owner, as discussed herein.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, blocks, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, blocks, features, objects, benefits and advantages. These also include embodiments in which the components and/or blocks are arranged and/or ordered differently.

Aspects of the present disclosure are described herein with reference to call flow illustrations and/or block diagrams of a method, apparatus (systems), and computer program products according to embodiments of the present disclosure. It will be understood that each block of the flowchart illustrations and/or block diagrams, and combinations of blocks in the call flow illustrations and/or block diagrams, can be implemented in hardware, software, or a combination thereof. In the context of software, the blocks represent computer readable and executable program instructions that, when executed by one or more processors, perform the recited operations. Generally, computer executable instructions may include routines, programs, objects, components, data structures, and the like that perform functions or implement abstract data types.

These computer readable and executable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the call flow process and/or block diagram block or blocks.

The computer readable program instructions may be stored in a non-transitory computer readable storage medium, which may be a tangible device that can retain and store instructions for use by an instruction execution device. The computer readable storage medium may be, for example, but is not limited to, a magnetic storage device an optical storage device, an electromagnetic storage device, or any suitable combination of the foregoing. A non-exhaustive list of more specific examples of a computer readable storage medium includes the following: a portable computer diskette, a hard disk, a random access memory (RAM), a read-only memory (ROM), an erasable programmable read only memory (EPROM or Flash memory), a static random access memory (SRAM), a portable compact disc rad-only memory (CD-ROM), a digital versatile disk (DVD), a memory stick, a floppy disk, a mechanically encoded device such as punch-cards or raised structure in a groove having instructions recorded thereon, and any suitable combination of the foregoing. A computer readable storage medium, as used herein is not to be construed as being transitory signals per se. such as radio waves or freely propagating electromagnetic waves, electromagnetic waves propagating through a waveguide or other transmission media (e.g., light pulses passing through a fiber-optic cable), or electrical signals transmitted through a wire.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, block, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method for reconstructing a compliance mapping due to an update in a regulation in the compliance mapping by a computing device, comprising:
    comparing a first version of a regulation in the compliance mapping to a second version of the regulation, the second version being an updated version of the first version;
    identifying a change in the second version with respect to the first version, wherein the change is an added control description, a deleted control description, or an updated control description;
    upon determining that the change is an updated control description, analyzing the updated control description to determine a type of update;
    reconstructing the mapping of the regulation based on the change and, if the change is an updated control description, based on the type of update, using natural language processing and/or machine learning;
    assessing a risk of the reconstructed mapping; and
    notifying a service owner about the risk of the identified changes.

2. The method of claim 1, wherein the type of update is at least one of: no semantic change in the updated control description, a modified action in the updated control description, an added action in the control description, or a deleted action in the control description.

3. The method of claim 2, wherein the type of update is determined, based on lexical analysis and/or semantic analysis.

4. The method of claim 2, wherein, the change is an updated control description of a baseline of the compliance mapping, and reconstructing the compliance mapping comprises:
    taking no action if the type of update is no semantic change; and
    upon determining that the update is a modified action in the updated control description, an added action in the control description, or a deleted action in the control description:
        applying natural language processing to generate a numerical representation of the updated control description; and
        comparing the numerical representation with numerical representations of unmapped control descriptions of mapped regulations.

5. The method of claim 2, wherein the change is an updated control description of a mapped regulation, and reconstructing the compliance mapping comprises:
    taking no action if the type of update is no semantic change; and
    if the update is a modified action in the updated control description, an added action in the control description, or a deleted action in the control description, using machine learning to classify the updated control description to control descriptions of a baseline regulation.

6. The method of claim 1, wherein, the change is an addition of a control description to a baseline regulation, and reconstructing the mapping of the regulation further comprises:
    generating a numerical representation of the added control description; and comparing the numerical representation to numerical representations of unmapped control descriptions of mapped regulations.

7. The method of claim 1, wherein, the change is an addition of a control description to a mapped regulation, and reconstructing the mapping of the regulation further comprises:
classifying the added control description to the baseline regulation by a machine learning model trained based on the compliance mapping.

8. A computing device comprising:
a processing device;
a network interface coupled to the processing device to enable communication over a network;
a storage device coupled to the processing device;
a mapping engine code stored in the storage device, wherein an execution of the code by the processing device causes the computing device to:
compare a first version of a regulation in the compliance mapping to a second version of the regulation, the second version being an updated version of the first version;
identify a change in the second version with respect to the first version, wherein the change is an added control description, a deleted control description, or an updated control description;
upon determining that the change is an updated control description, analyze the updated control description to determine a type of update;
reconstruct the mapping of the regulation based on the change and, if the change is an updated control description, based on the type of update, using natural language processing and/or machine learning;
assess the risk of the reconstructed mapping; and
notify a service owner about the risk of the identified changes.

9. The computing device of claim 8, wherein the type of update is one of no semantic change in the updated control description, a modified action in the updated control description, an added action in the control description, or a deleted action in the control description.

10. The computing device of claim 9, wherein the type of update is determined based on lexical analysis and/or semantic analysis.

11. The computing device of claim 9, wherein, the change is an updated control description of a baseline of the compliance mapping, and execution of the code by the processing device further configures the computing device to reconstruct the compliance mapping, by:
taking no action if the type of update is no semantic change; and
upon determining that the update is one of a modified action in the updated control description, an added action in the control description, or a deleted action in the control description:
applying a natural language processing and machine learning to generate a numerical representation of the updated control description; and
comparing the numerical representation with numerical representations of unmapped control descriptions of mapped regulations.

12. The computing device of claim 9, wherein, the change is an updated control description of a mapped regulation, and execution of the code by the processing device further configures the computing device to reconstruct the compliance mapping by:
taking no action if the type of update is no semantic change; and
upon determining that the update is one of a modified action in the updated control description, an added action in the control description, or a deleted action in the control description, using machine learning to classify the updated control description to control descriptions of a baseline regulation.

13. The computing device of claim 8, wherein, the change is an addition of a control description to a baseline regulation, and execution of the code by the processing device further configures the computing device to reconstruct the compliance mapping by:
generating a numerical representation of the added control description; and
comparing the numerical representation to numerical representations of unmapped control descriptions of mapped regulations.

14. The computing device of claim 8, wherein, the change is an addition of a control description to a mapped regulation, and execution of the code by the processing device further configures the computing device to reconstruct the compliance mapping by:
classifying the added control description to the baseline regulation by a machine learning model trained based on the compliance mapping.

15. A non-transitory computer readable storage medium tangibly embodying a computer readable program code having computer readable instructions that, when executed, causes a computing device to reconstruct a compliance mapping due to an update in a regulation in the compliance mapping, by:
comparing a first version of a regulation in the compliance mapping to a second version of the regulation, the second version being an updated version of the first version;
identifying a change in the second version with respect to the first version, wherein the change is one of an added control description, a deleted control description, or an updated control description;
upon determining that the change is an updated control description, analyzing the updated control description to determine a type of update;
reconstructing the mapping of the regulation based on the change and, if the change is an updated control description, based on the type of update, using natural language processing and/or machine learning;
assessing a risk of the reconstructed mapping; and
notifying a service owner about the risk of the identified changes.

16. The non-transitory computer readable storage medium of claim 15, wherein the type of update is one of no semantic change in the updated control description, a modified action in the updated control description, an added action in the control description, or a deleted action in the control description.

17. The non-transitory computer readable storage medium of claim 15, wherein the type of update is determined based on one of lexical analysis or semantic analysis.

18. The non-transitory computer readable storage medium of claim 16, wherein, the change is an updated control description of a baseline of the compliance mapping, and the computer readable code causes the computing device to reconstruct the compliance mapping by:
taking no action if the type of update is no semantic change; and upon determining that the update is one of a modified action in the updated control description, an added action in the control description, or a deleted action in the control description:
applying a natural language processing and machine learning to generate a numerical representation of the updated control description; and
comparing the numerical representation with numerical representations of unmapped control descriptions of mapped regulations.

19. The non-transitory computer readable storage medium 16, wherein, the change is an updated control description of a mapped regulation, and the computer readable code causes the computing device to reconstruct the compliance mapping by:
taking no action if the type of update is no semantic change; and
upon determining that the update is one of a modified action in the updated control description, an added action in the control description, or a deleted action in the control description, using machine learning to classify the updated control description to control descriptions of a baseline regulation.

20. The non-transitory computer readable storage medium of claim 15, wherein, the change is an addition of a control description to a baseline regulation, and the computer readable code causes the computing device to reconstruct the compliance mapping by:
generating a numerical representation of the added control description; and
comparing the numerical representation to numerical representations of unmapped control descriptions of mapped regulations; and
upon determining that the change is an addition of a control description to a mapped regulation, the computer readable code causes the computing device to reconstruct the compliance mapping by:
classifying the added control description to the baseline regulation by a machine learning model trained based on the compliance mapping.

* * * * *